US012612086B1

(12) United States Patent

Kumar et al.

(10) Patent No.: US 12,612,086 B1

(45) Date of Patent: Apr. 28, 2026

(54) COMPACT FREIGHT SENSOR PACKAGES AND METHODS OF MONITORING TRANSPORT PROCESSES USING SAME

(71) Applicant: Amazon Technologies, Inc., Seattle, WA (US)

(72) Inventors: Gaurav Kumar, Bellevue, WA (US); Nicholas G. Dyshaw, Stillwater, MN (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 18/343,135

(22) Filed: Jun. 28, 2023

(51) Int. Cl.
B61L 15/00 (2006.01)
G01S 13/88 (2006.01)

(52) U.S. Cl.
CPC .......... B61L 15/0027 (2013.01); G01S 13/88 (2013.01)

(58) Field of Classification Search
CPC .. G06Q 10/08; G06Q 10/0833; G06Q 10/083; G06Q 20/203; B65D 90/22; B65D 2401/00; B65D 88/00; B61L 15/0027; G01S 13/88
USPC .......................................................... 340/933
See application file for complete search history.

(56) References Cited

U.S. PATENT DOCUMENTS

| | | | | | |
|---|---|---|---|---|---|
| 3,961,323 | A | * | 6/1976 | Hartkorn | G08B 13/22 |
| | | | | | 340/568.2 |
| 7,554,441 | B2 | * | 6/2009 | Viegers | H04L 41/00 |
| | | | | | 340/870.34 |
| 7,734,102 | B2 | * | 6/2010 | Bergeron | G06T 7/0004 |
| | | | | | 382/151 |
| 8,384,538 | B2 | * | 2/2013 | Breed | G01S 17/04 |
| | | | | | 340/10.33 |
| 8,643,503 | B2 | * | 2/2014 | Mostov | G06Q 10/0833 |
| | | | | | 340/693.5 |
| 8,786,437 | B2 | * | 7/2014 | Breed | G06V 20/52 |
| | | | | | 340/568.1 |
| 8,994,546 | B2 | * | 3/2015 | Breed | B65D 90/48 |
| | | | | | 342/44 |
| 9,030,321 | B2 | * | 5/2015 | Breed | G01S 13/04 |
| | | | | | 455/39 |
| 10,161,746 | B2 | * | 12/2018 | Ochsendorf | G01B 11/28 |

(Continued)

OTHER PUBLICATIONS

LoRa Alliance, "LoRaWAN," www.lora-alliance.org, LoRa Alliance, URL: https://lora-alliance.org/about-lorawan/, 3 pages, obtained Jun. 12, 2023.

(Continued)

*Primary Examiner* — Eric Blount
(74) *Attorney, Agent, or Firm* — Athorus, PLLC

(57) ABSTRACT

Compact freight sensor packages may comprise a processor, memory, onboard power supply, mmWave radar sensor, various additional sensors, various visual/audio devices, and various communication devices. For example, the mmWave radar sensor may detect movements or changes to objects that are placed into, moved within, or removed from trailers or containers during loading, transporting, and unloading processes. Based on the detected movements or changes, various events may be determined, identified, or corrected. Further, unloading or other downstream processes may be modified based on determined events, such as unintended, unauthorized, or potentially hazardous movement or changes to objects within trailers during transport.

20 Claims, 11 Drawing Sheets

(56) References Cited

U.S. PATENT DOCUMENTS

| | | | | |
|---|---|---|---|---|
| 10,302,807 | B2 * | 5/2019 | Yu | G06F 18/24 |
| 11,663,889 | B2 * | 5/2023 | Volkerink | G06K 7/10366 |
| | | | | 340/568.1 |
| 11,674,841 | B2 * | 6/2023 | Slavin | G06Q 10/0832 |
| | | | | 340/568.1 |
| 11,688,271 | B2 * | 6/2023 | Wright | G08B 25/005 |
| | | | | 340/506 |
| 11,741,822 | B2 * | 8/2023 | Volkerink | G08B 21/0286 |
| | | | | 340/541 |
| 11,776,380 | B2 * | 10/2023 | Volkerink | G08B 21/182 |
| | | | | 340/539.1 |
| 2004/0113783 | A1 * | 6/2004 | Yagesh | G07C 9/27 |
| | | | | 340/568.1 |
| 2005/0179545 | A1 * | 8/2005 | Bergman | G08B 25/08 |
| | | | | 340/539.1 |
| 2006/0181413 | A1 * | 8/2006 | Mostov | G08B 25/08 |
| | | | | 340/539.22 |
| 2008/0236275 | A1 * | 10/2008 | Breed | B60R 21/015 |
| | | | | 73/290 V |
| 2010/0253519 | A1 * | 10/2010 | Brackmann | B60P 3/03 |
| | | | | 340/572.1 |
| 2013/0033381 | A1 * | 2/2013 | Breed | G08B 13/2417 |
| | | | | 340/568.1 |
| 2013/0069776 | A1 * | 3/2013 | Haber | B60R 25/403 |
| | | | | 340/463 |
| 2014/0070943 | A1 * | 3/2014 | Breed | B60R 21/01554 |
| | | | | 340/539.22 |
| 2014/0218218 | A1 * | 8/2014 | Lloreda | G08G 1/207 |
| | | | | 340/989 |
| 2015/0225991 | A1 * | 8/2015 | Aragon | B60J 5/12 |
| | | | | 49/506 |
| 2015/0287308 | A1 * | 10/2015 | Shuttleworth | G08B 25/00 |
| | | | | 340/693.1 |
| 2018/0374039 | A1 * | 12/2018 | Walden | G06Q 10/0875 |

OTHER PUBLICATIONS

Vayyar Imaging Ltd, "Vayyar Automotive," www.vayyar.com, Vayyar Imaging Ltd, URL: https://vayyar.com/auto/technology/79ghz/, 7 pages, obtained on Jun. 12, 2023.

* cited by examiner

200

105

| PROCESSOR 210 | MEMORY 212 | RECHARGEABLE BATTERY 214 |
| GPS/GNSS RECEIVERS 218 | IMU / ACCELEROMETER 230 | CONNECTION TO EXTERNAL POWER 216 |
| mmWave RADAR 220 | TEMPERATURE SENSOR 232 | |
| BLUETOOTH SENSOR 222 | IMAGING SENSORS 234 | |
| ULTRA-WIDEBAND COMMUNICATION DEVICE 224 | MICROPHONE 236 | |
| CELLULAR COMMUNICATION DEVICE 226 | LIGHTS/SPEAKERS 238 | |
| LONG RANGE COMMUNICATION DEVICE 228 | | |

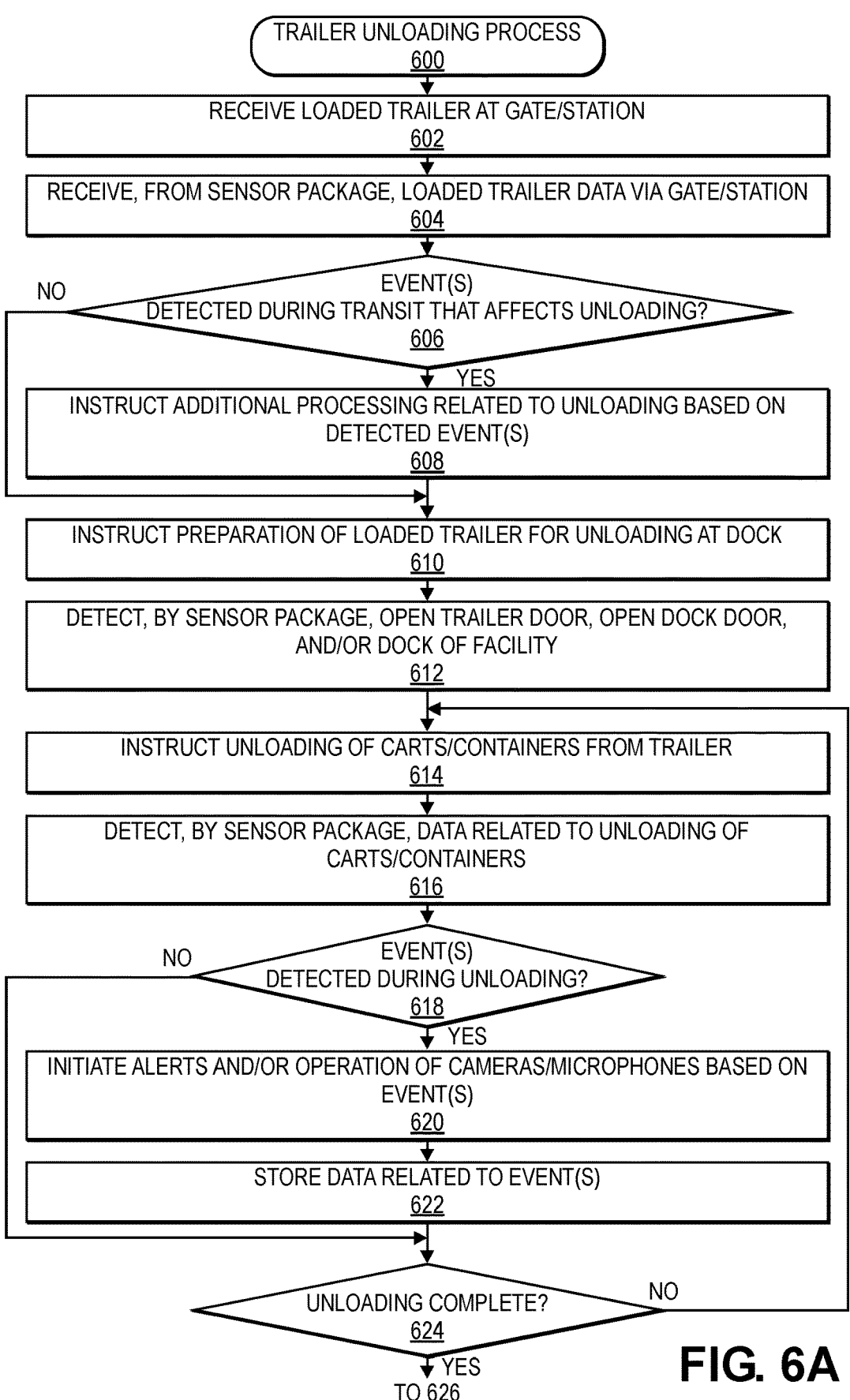

TRAILER UNLOADING PROCESS
600

RECEIVE LOADED TRAILER AT GATE/STATION
602

RECEIVE, FROM SENSOR PACKAGE, LOADED TRAILER DATA VIA GATE/STATION
604

EVENT(S)
DETECTED DURING TRANSIT THAT AFFECTS UNLOADING?
606

NO YES

INSTRUCT ADDITIONAL PROCESSING RELATED TO UNLOADING BASED ON DETECTED EVENT(S)
608

INSTRUCT PREPARATION OF LOADED TRAILER FOR UNLOADING AT DOCK
610

DETECT, BY SENSOR PACKAGE, OPEN TRAILER DOOR, OPEN DOCK DOOR, AND/OR DOCK OF FACILITY
612

INSTRUCT UNLOADING OF CARTS/CONTAINERS FROM TRAILER
614

DETECT, BY SENSOR PACKAGE, DATA RELATED TO UNLOADING OF CARTS/CONTAINERS
616

EVENT(S)
DETECTED DURING UNLOADING?
618

NO YES

INITIATE ALERTS AND/OR OPERATION OF CAMERAS/MICROPHONES BASED ON EVENT(S)
620

STORE DATA RELATED TO EVENT(S)
622

UNLOADING COMPLETE?
624

NO

YES
TO 626

FIG. 6A

COMPACT FREIGHT SENSOR PACKAGES AND METHODS OF MONITORING TRANSPORT PROCESSES USING SAME

BACKGROUND

Many companies may receive, sort, store, package, and ship items and/or groups of items from material handling facilities. For example, many companies may receive, store, sort, load, transfer, and unload items between material handling facilities and various destinations. However, loading, transporting, and/or unloading processes may be susceptible to various errors or events, such as unintended movements, damage, loss, or potential safety issues. Accordingly, there is a need for compact, rugged, low power, and low compute freight sensor packages to facilitate efficient, reliable, and safe material handling processes, including loading, transporting, and/or unloading processes.

BRIEF DESCRIPTION OF THE DRAWINGS

FIG. 6A-6B is a flow diagram illustrating an example trailer unloading process, in accordance with implementations of the present disclosure.

DETAILED DESCRIPTION

Figure 1A:
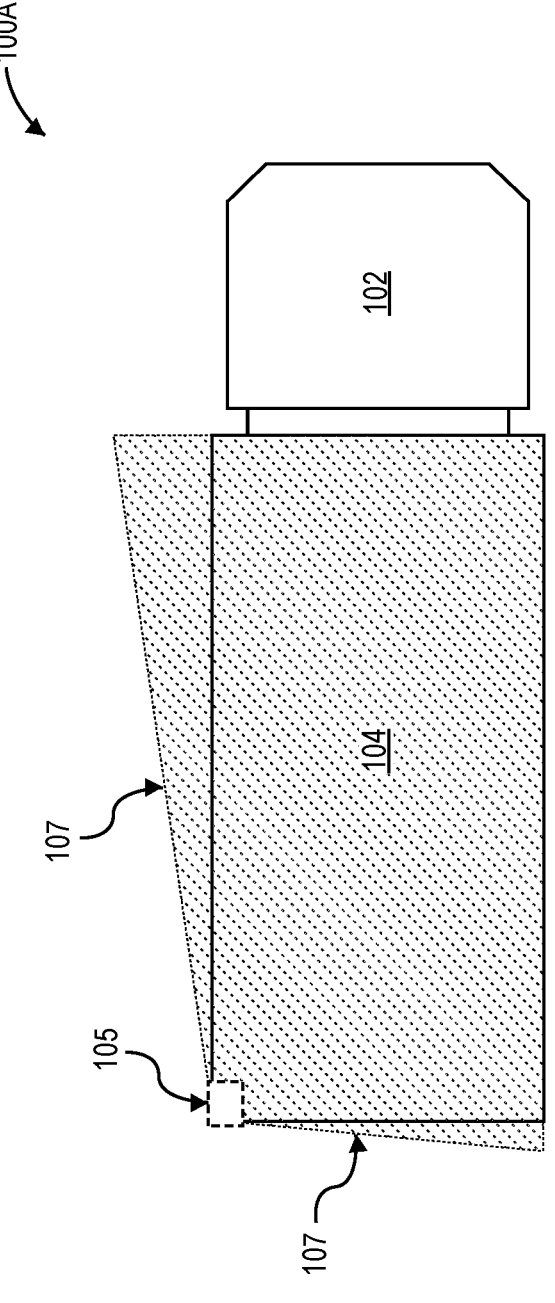
FIG. 1A is a schematic, top-down view diagram of an example trailer having a freight sensor package, in accordance with implementations of the present disclosure.

As is set forth in greater detail below, implementations of the present disclosure are directed to compact, rugged, low power, and low compute freight sensor packages to facilitate efficient, reliable, and safe material handling processes, such as loading, transporting, and/or unloading processes.

Some conventional trailer sensors may include global positioning system (GPS) receivers with cellular communication devices, but such GPS receivers may not receive or transmit any data in areas with poor or no GPS signals and/or with poor cellular coverage. Other conventional trailer sensors may include ultrasonic sensors or cameras to detect packages or containers within trailers; however, data from such sensors may require high memory usage and computationally expensive processing, such as various image processing algorithms. Still other conventional trailer sensors may include contact sensors to detect open or closed states of trailer doors, but such sensors may detect various false positives during transit, e.g., along bumpy or uneven terrain. Further conventional trailer sensors may include physical RFID locks that are looped around trailer door locks or handles, but data from such sensors may only be retrieved at destination locations and generally provide little or no contextual data related to opening, breakage, or removal of such sensors.

In example embodiments, the compact freight sensor packages described herein may be positioned, coupled, or associated with freight trailers or other transport containers. The freight sensor packages may be positioned or oriented to capture various types of data associated with items or packages within the trailers or containers, including loading, transporting, and/or unloading processes. Moreover, the freight sensor packages may be low power, low memory, and low compute devices that are still capable of capturing various contextual data related to errors or events during loading, transporting, and/or unloading processes.

In example embodiments, the freight sensor packages may comprise mmWave radar sensors, Bluetooth sensors or receivers, ultra-wideband communication devices, global positioning system (GPS) or global navigation satellite system (GNSS) receivers or antennae, inertial measurement units and/or accelerometers, imaging sensors, audio input devices, and/or temperature sensors. In addition, the freight sensor packages may comprise processors, memories, onboard power sources, connections to remote power sources, high bandwidth communication devices, cellular communication devices, long-range communication devices, and/or one or more output devices, such as visual and/or audio output devices.

Using the various sensors associated with the freight sensor packages, various data associated with items, packages, or procedures during loading, transporting, and/or unloading processes may be captured and stored. In addition, the captured data may be processed onboard the freight sensor packages, and/or transmitted to remote processors via ground stations for additional processing of the captured data. Further, one or more alerts, information, or instructions may be provided to drivers, yard agents, managers, or various other agents based on processing of the captured data. The various alerts, information, and instructions may ensure correct processing of items or packages, reduce loss or damage, and/or ensure safety of various agents.

In additional example embodiments, the freight sensor packages may include various communication devices and corresponding communication technologies to maintain connectivity of substantially all trailers or containers. For example, the freight sensor packages may include high bandwidth communication devices to send and receive data via high bandwidth communication technologies, e.g., WiFi or others. In addition, the freight sensor packages may include cellular communication devices to send and receive data via cellular communication technologies. Further, the freight sensor packages may also include long-range communication devices to send and receive data with other freight sensor packages within communication range via such long-range communication technologies, e.g., a peer-to-peer, long-range, mesh communication network of freight sensor packages and associated trailers or containers.

In further example embodiments, the freight sensor packages may be utilized in fixed locations, e.g., in yards of material handling facilities or otherwise near such facilities, and the freight sensor packages may be modified for such static or fixed implementations. The sensor packages may be positioned, coupled, or associated with various structures or objects proximate a facility. In addition, the sensor packages may be positioned or oriented to capture data associated with vehicles, trailers, containers, items, packages, agents, or other objects proximate a facility, e.g., within a yard during various loading, transporting, and/or unloading processes.

The compact freight sensor packages described herein and associated methods of monitoring various loading, transporting, and/or unloading processes using the freight sensor packages may capture data related to various errors or events, such as unintended movements, damage, loss, or potential safety issues. Based on processing of the captured data by onboard processors and/or remote processors, the efficiency, reliability, and safety of various material handling processes may be improved.

FIG. 1A is a schematic, top-down view diagram 100A of an example trailer having a freight sensor package, in accordance with implementations of the present disclosure.

As shown in FIG. 1A, an example trailer 104 coupled to a tractor 102 may comprise a freight sensor package 105. The example trailer 104 may comprise a ground-based trailer that is engaged by and pulled by a ground-based tractor 102. In other example embodiments, the example trailer 104 may comprise a freight container, a shipping container, a storage container, a unit load device, or various other containers that may be transported by ground, water, and/or air. Further, the tractor 102 may comprise various types of vehicles, such as trucks, cabs, vans, box trucks, other ground-based vehicles, or other marine or aerial vehicles that may pull, receive, and/or transport the trailer 104.

The example freight sensor package 105 described herein may comprise various types of sensors, various types of communication devices, various power sources or connections thereto, various input/output devices, and/or various processors, memories, or other software, firmware, applications, or programs. The freight sensor package 105 may be configured to operate with low power, low memory usage, and low computing power by intentional selection and incorporation of various types of sensors that may capture data using low power and low memory, which data may also be processed by onboard processors using low power and low computing power. In additional example embodiments described herein, the data may be transmitted to various remote computing resources, processors, or systems to perform further processing of the data captured by the freight sensor package 105. By inclusion of the various components within the freight sensor package 105, the sensor package 105 may comprise a multi-purpose, low power, low cost sensor package that is configured to detect errors or events associated with various trailer loading, transporting, or unloading processes.

In some example embodiments described herein, the freight sensor package 105 may include one or more millimeter wave (mmWave) radar sensors with a corresponding field of view 107. For example, the field of view 107 of the mmWave radar sensor may be inclusive of an interior of the trailer 104, and each of the walls, floor, and ceiling of the interior of the trailer 104. In this manner, the mmWave radar sensor may capture data associated with items, packages, containers, or carts moved and positioned within the interior of the trailer 104, as well as movement or procedures performed within the interior of the trailer 104. In addition, the mmWave radar sensor may also detect open and/or closed states of a rear trailer door of the trailer 104, e.g., toward a left side of FIG. 1A.

Various other sensors, e.g., Bluetooth receivers, ultra-wideband communication devices, imaging sensors, microphones, or others, of the freight sensor package 105 may also have respective fields of view or detection that are similar to or inclusive of the field of view 107 illustrated in FIG. 1A and described with respect to an example mmWave radar sensor. Further details of components, functions, and operations of the example freight sensor package 105 are described herein at least with respect to FIG. 2.

Figure 1B:
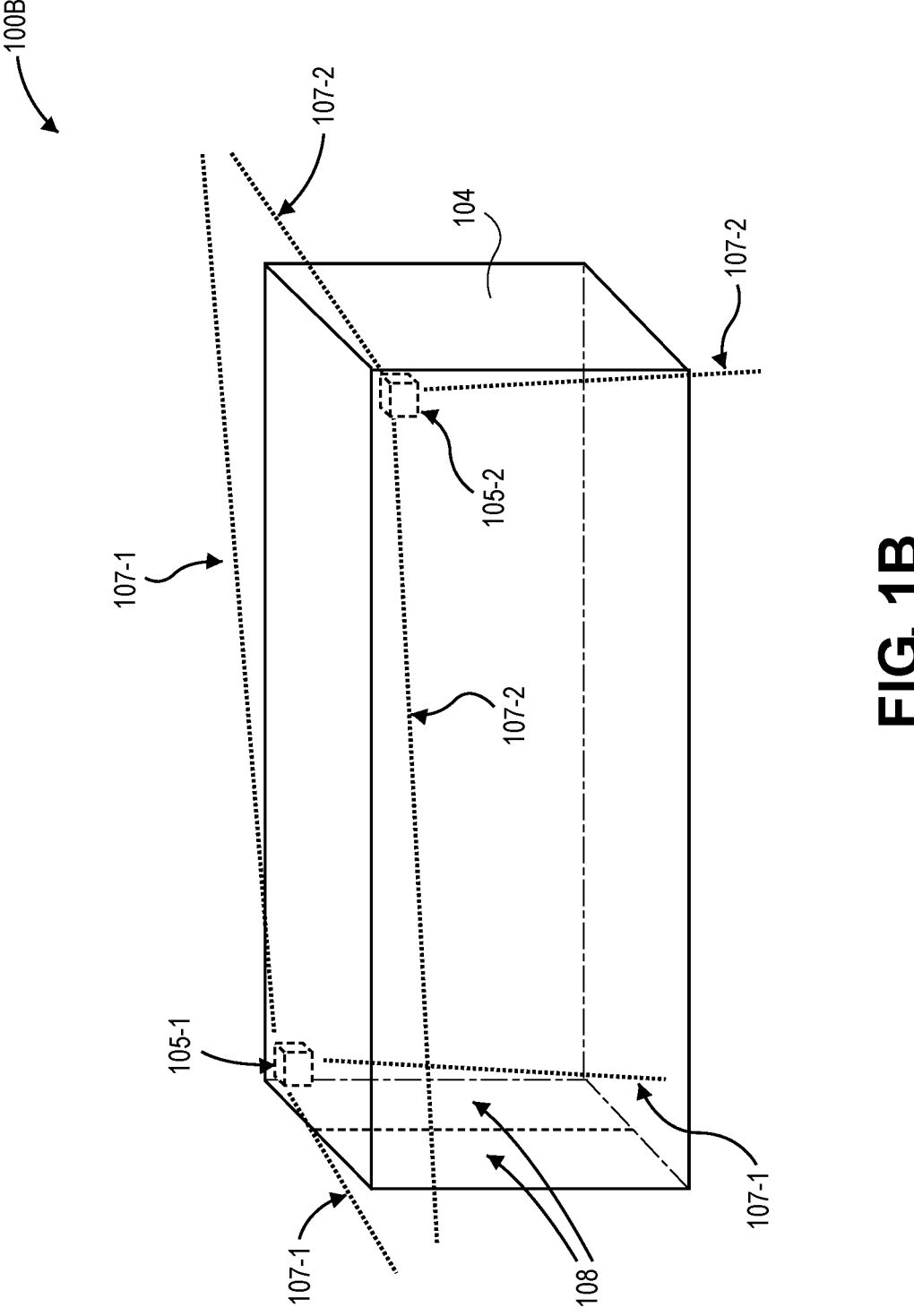
FIG. 1B is a schematic, perspective view diagram of an example trailer having a plurality of freight sensor packages, in accordance with implementations of the present disclosure.

FIG. 1B is a schematic, perspective view diagram 100B of an example trailer having a plurality of freight sensor packages, in accordance with implementations of the present disclosure.

Similar to that shown and described with respect to FIG. 1A, FIG. 1B illustrates an example trailer 104 having a plurality of freight sensor packages 105. For example, the trailer 104 may include two or more freight sensor packages 105-1, 105-2. In the example of FIG. 1B, a first sensor package 105-1 may be positioned or coupled at an upper corner and toward a rear side of the trailer 104, and a second sensor package 105-2 may be positioned or coupled at an upper corner and toward a front side of the trailer 104. In addition, the first sensor package 105-1 may be positioned proximate trailer doors 108 at a rear side of the trailer 104.

Each of the freight sensor packages 105-1, 105-2 may comprise a plurality of sensors, communication devices, power sources, input/output devices, processors, memories, and/or other components. By inclusion of the various components within the freight sensor packages 105-1, 105-2, the sensor packages 105-1, 105-2 may comprise multi-purpose, low power, low cost sensor packages that are configured to detect errors or events associated with various trailer loading, transporting, or unloading processes. In addition, one or more sensors of the freight sensor packages 105-1, 105-2 may have respective fields of view or detection 107-1, 107-2, e.g., associated with at least one or more mmWave radar sensors and/or various other sensors of the sensor packages 105-1, 105-2.

For example, each of the first and second sensor packages 105-1, 105-2 may have one or more sensors with a field of view 107-1, 107-2, respectively, that is inclusive of an interior of the trailer 104, and each of the walls, floor, and ceiling of the interior of the trailer 104. In this manner, at least the mmWave radar sensors of the first and second sensor packages 105-1, 105-2 may capture data associated with items, packages, containers, or carts moved and positioned within the interior of the trailer 104, as well as movement or procedures performed within the interior of the trailer 104. In addition, at least the mmWave radar sensors of the first and second sensor packages 105-1, 105-2 may also detect open and/or closed states of rear trailer doors 108 of the trailer 104.

As further described herein, the various sensors of the sensor packages 105-1, 105-2 may detect movements or positions of items, packages, carts, containers, agents, or other objects within an interior of the trailer 104. In addition, the various sensors of the sensor packages 105-1, 105-2 may detect aspects, conditions, or operations, e.g., acceleration data, temperature data, imaging data, audio data, or others, within the interior of the trailer 104. Further, the various communication devices of the sensor packages 105-1, 105-2 may send and/or receive data, information, or instructions related to data captured by the sensors and/or based on processing of the data. Further details of components, functions, and operations of the example freight sensor packages 105 are described herein at least with respect to FIG. 2.

Figure 2:
FIG. 2 is a schematic block diagram of an example freight sensor package, in accordance with implementations of the present disclosure.

FIG. 2 is a schematic block diagram 200 of an example freight sensor package, in accordance with implementations of the present disclosure.

As shown in FIG. 2, an example freight sensor package 105 may comprise one or more processors 210, memories 212, rechargeable batteries or other onboard power sources 214, and/or connections 216 to external power sources. In addition, the example freight sensor package 105 may comprise one or more global positioning system (GPS) or global navigation satellite system (GNSS) receivers 218, mmWave radar sensors 220, Bluetooth sensors 222, ultra-wideband communication devices 224, inertial measurement units and/or accelerometers 230, temperature sensors 232, imaging sensors 234, microphones or other audio input devices 236, and/or lights, speakers, or other visual/audio output devices 238. Further, the example freight sensor package 105 may comprise one or more cellular communication devices 226, long range communication devices 228, high bandwidth communication devices, and/or other communication devices.

For example, the processors 210 may comprise various types of microcontrollers or other types of processors that are configured to command or instruct operation of various sensors, communication devices, visual/audio input/output devices, or other components of the sensor package 105. The processors 210 may also be configured to perform onboard processing of at least some of the data captured by various sensors. The processors 210 may have relatively low computing capacity or capability, and may thereby utilize low power during onboard processing.

The memories 212 may be configured to receive and store data captured by various sensors, as well as store or maintain software, firmware, applications, or programs, e.g., for onboard processing of captured data. For example, the memories 212 may store sensor data processing applications and/or event detection algorithms, which may comprise various machine learning models or algorithms designed or configured for onboard processing by the processors 210. The memories 212 may have relatively low storage capacity or capability, e.g., approximately 512 GB storage capacity, and the captured data from various sensors may require relatively low memory storage capacity. For example, data captured by the various sensors of a freight sensor package 105 may be stored within the onboard memories 212 during and throughout loading and/or transport processes, and may be transmitted to remote computing resources prior to and during unloading processes. In other examples, data captured by the various sensors of a freight sensor package 105 may be stored within the onboard memories 212 until the data can be transmitted to remote computing resources via one or more communication devices, e.g., during any of the loading, transporting, and/or unloading processes.

The rechargeable batteries or other onboard power sources 214 may be configured to provide power to the various sensors, communication devices, visual/audio input/output devices, or other components of the sensor package 105. For example, the batteries or onboard power sources 214 may have relatively low power capacity or characteristics, e.g., approximately 30,000 mAh rechargeable batteries, and may be configured to provide power to the various components of the sensor package 105 during various portions of loading, transporting, and/or unloading processes. Generally, the onboard power sources 214 may be used to provide power to components of the sensor package 105 when external or remote power sources may be unavailable. Further, the onboard power sources 214 may be recharged when connected to external or remote power sources, by solar charging via solar panels associated with the trailer 104, a tractor 102, or a facility or building, and/or by other means.

The connections 216 to external power sources may comprise various types of electrical connections to one or more external or remote power sources. The external power sources may be associated with a power source of a facility or building, an engine, battery, or other power source of a vehicle or tractor 102, external power generators or other sources, and/or various other types of remote power sources. When the freight sensor package 105 is connected to an external power source via the connection 216, the freight sensor package 105 may utilize power from the external or remote power source for various components, instead of the onboard power sources 214. In addition, the external or remote power sources may provide power via the connections 216 to recharge the onboard power sources 214.

The GPS or GNSS receivers 218 may comprise various types of global positioning data receivers configured to capture location data of the freight sensor package 105 and associated trailer 104. Location data during loading, transporting, and/or unloading processes may be captured and stored. In addition, location data may be captured in response to detection of various errors or events by one or more sensors. Further, the location data may also include timestamps that indicate various times associated with particular locations of the sensor package 105.

The mm Wave radar sensors 220 may comprise various time of flight sensors that are configured to transmit and receive short wavelength electromagnetic waves. For example, mmWave radar sensors 220 may transmit and receive signals in a frequency range between approximately 30 GHz and approximately 300 GHz, with an effective range of up to approximately 300 meters.

Generally, mmWave radar sensors 220 may consume relatively low power while capturing data at relatively high resolution, although lower resolution than most imaging sensors. In addition, mmWave radar sensors 220 may have relatively high precision, small size, and low cost. Moreover, mmWave radar sensors 220 may operate more reliably in various lighting or visibility conditions, such as darkness, low light, direct sunlight, bright light, fog, smoke, or other visual occlusions that adversely affect imaging data from imaging sensors or cameras.

As a result, the mmWave radar sensors 220 may operate substantially continuously using onboard power sources 214 with relatively low power capacity, e.g., during loading, transporting, and/or unloading processes. Further, because the resolution is lower than imaging data, the data captured by mmWave radar sensors 220 may be stored by onboard memories 212 with relatively low storage capacity, and may be processed by onboard processors 210 with relatively low computing capacity. Moreover, because of their relatively lower resolution, data captured by mm Wave radar sensors 220 may be transmitted via relatively low bandwidth communication connections to various remote computing resources.

In example embodiments, the mmWave radar sensors 220 may capture data of items, packages, carts, containers, agents, or other objects that are moved or positioned within a trailer 104, e.g., during loading and/or unloading processes. In addition, the mmWave radar sensors 220 may capture data of items, packages, carts, containers, or other objects that may move, slide, shift, lean, or fall over within the trailer 104, e.g., during transport processes. Further, the mmWave radar sensors 220 may capture data related to open and/or closed states of doors of the trailer 104, open and/or closed states of a dock door that may be proximate opened doors of the trailer 104, and/or portions of a dock or interior of a facility that may be proximate opened doors of the trailer 104.

Based on data captured by the mmWave radar sensors 220 related to movement or positions of objects or opening/closing of doors during various processes, one or more sensors, communication devices, visual/audio input/output devices, or other components of the sensor package 105 may be triggered or initiated. For example, operations of the ultra-wideband communication devices 224, if not in continuous operation, may be initiated to detect any movement or positions of objects within the trailer 104. In addition, operations of imaging sensors 234 or audio input devices 236 may be initiated to capture imaging or audio data related to any movement or positions of objects within the trailer 104. Further, various visual and/or audio output devices 238 may be initiated to provide or present alerts or information related to any detected movement or positions of objects within the trailer 104. Moreover, captured data related to various errors or events, such as movement or positions of objects, opening/closing of doors, or other events, may be stored in the memories 212 and/or processed by the processors 210.

The Bluetooth sensors 222 may comprise various types of Bluetooth, Bluetooth Low Energy (BLE), or other similar short range communication devices that may receive data from various Bluetooth, BLE, or other short range sensors, beacons, or transmitters. For example, the various Bluetooth, BLE, or other sensors, beacons, or transmitters may be associated with items, packages, carts, containers, or other objects. In some examples, various Bluetooth tags or beacons may be coupled or associated with items, packages, carts, containers, or other objects, and the Bluetooth sensors 222 may capture data associated with such objects as they are moved or positioned within communication range, e.g., within or proximate the trailer 104.

In example embodiments, the Bluetooth sensors 222 may capture data of items, packages, carts, containers, agents, or other objects that are moved or positioned within a trailer 104, e.g., during loading and/or unloading processes. In addition, the Bluetooth sensors 222 may capture data related to continued presence, absence, or removal of items, packages, carts, containers, or other objects within the trailer 104, e.g., during transport processes.

Based on data captured by the Bluetooth sensors 222 related to movement or positions of objects during various processes, one or more sensors, communication devices, visual/audio input/output devices, or other components of the sensor package 105 may be triggered or initiated. For example, operations of the mmWave radar sensors 220 or the ultra-wideband communication devices 224, if not in continuous operation, may be initiated to detect any movement or positions of objects within the trailer 104. In addition, operations of imaging sensors 234 or audio input devices 236 may be initiated to capture imaging or audio data related to any movement or positions of objects within the trailer 104. Further, various visual and/or audio output devices 238 may be initiated to provide or present alerts or information related to any detected movement or positions of objects within the trailer 104. Moreover, captured data related to various errors or events, such as movement or positions of objects, incorrect loading of objects, incorrect unloading of objects, or other events, may be stored in the memories 212 and/or processed by the processors 210.

The ultra-wideband communication devices 224 may comprise various types of communication devices configured to receive data from asset beacons associated with items, packages, carts, containers, agents, or other objects. The asset beacons may include data of the associated objects, such as identifiers, types, status, or other uniquely identifying information, and may also include one or more sensors to detect data of the associated objects. In addition, the asset beacons may also include ultra-wideband communication devices configured to transfer or transmit data from the asset beacons to the ultra-wideband communication devices 224 of the sensor package 105.

Further, based on the time of flight of signals transmitted to and received from various asset beacons and associated objects, positions of the asset beacons and objects relative to one or more ultra-wideband communication devices 224, e.g., associated with multiple sensor packages 105 within a trailer 104, may be localized or triangulated. In this manner, various objects that are moved or positioned within the trailer 104 may be identified based on data from the ultra-wideband communication devices 224, and particular movements or positions of the objects within the trailer 104 may be determined based on data from the ultra-wideband communication devices 224.

In example embodiments, the ultra-wideband communication devices 224 may capture data of items, packages, carts, containers, agents, or other objects that are moved or positioned within a trailer 104, e.g., during loading and/or unloading processes. In addition, the ultra-wideband communication devices 224 may capture data of items, packages, carts, containers, or other objects that may move, slide, shift, lean, or fall over within the trailer 104, e.g., during transport processes.

Based on data captured by the ultra-wideband communication devices 224 related to movement or positions of objects during various processes, one or more sensors, communication devices, visual/audio input/output devices, or other components of the sensor package 105 may be triggered or initiated. For example, operations of the mmWave radar sensors 220 or the Bluetooth sensors 222, if not in continuous operation, may be initiated to detect any movement or positions of objects within the trailer 104. In addition, operations of imaging sensors 234 or audio input devices 236 may be initiated to capture imaging or audio data related to any movement or positions of objects within the trailer 104. Further, various visual and/or audio output devices 238 may be initiated to provide or present alerts or information related to any detected movement or positions of objects within the trailer 104. Moreover, captured data related to various errors or events, such as movement or positions of objects, incorrect loading of objects, incorrect unloading of objects, or other events, may be stored in the memories 212 and/or processed by the processors 210.

The inertial measurement units and/or accelerometers 230 may comprise various types of sensors to detect movement, acceleration, vibration, impacts, or other aspects related to movement of the sensor package 105 and trailer 104. For example, the inertial measurement units and/or accelerometers 230 may capture data related to acceleration, deceleration, turns, changes of direction, impacts or accidents, and/or other movement characteristics of the trailer 104, e.g., during transport processes.

In example embodiments, based on data captured by the inertial measurement units and/or accelerometers 230 related to movement characteristics, one or more sensors, communication devices, visual/audio input/output devices, or other components of the sensor package 105 may be triggered or initiated. For example, operations of the mmWave radar sensors 220 and/or ultra-wideband communication devices 224, if not in continuous operation, may be initiated to detect any movement, positions, or other changes to various objects within the trailer 104. In addition, operations of imaging sensors 234 or audio input devices 236 may be initiated to capture imaging or audio data related to any movement, positions, or other changes to various objects within the trailer 104. Further, various visual and/or audio output devices 238 may be initiated to provide or present alerts or information related to any detected movement, positions, or other changes to objects within the trailer 104. Moreover, captured data related to various errors or events, such as movement of objects, shifting, leaning, or falling over of objects, various other changes to objects, or other events, may be stored in the memories 212 and/or processed by the processors 210.

The temperature sensors 232 may comprise various types of sensors configured to detect or capture data associated with temperature proximate or within the trailer 104. For example, the temperature sensors 232 may capture data associated with a temperature in a portion of the trailer 104 that is near or proximate the sensor package 105, e.g., during loading, transporting, and/or unloading processes.

In example embodiments, based on data captured by the temperature sensors 232, one or more sensors, communication devices, visual/audio input/output devices, or other components of the sensor package 105 may be triggered or initiated. For example, operations of the mmWave radar sensors 220 and/or ultra-wideband communication devices 224, if not in continuous operation, may be initiated to detect any movement, positions, or other changes to various objects within the trailer 104. In addition, operations of imaging sensors 234 or audio input devices 236 may be initiated to capture imaging or audio data related to any movement, positions, or other changes to various objects within the trailer 104. Further, various visual and/or audio output devices 238 may be initiated to provide or present alerts or information related to any detected movement, positions, or other changes to objects within the trailer 104. Moreover, captured data related to various errors or events, such as hazardous low temperatures, hazardous high temperatures, or other events, may be stored in the memories 212 and/or processed by the processors 210.

The imaging sensors 234 may comprise various types of cameras, imaging devices, or other imaging sensors configured to capture imaging data of an interior of a trailer 104. For example, the imaging sensors 234 may capture still imaging data, video imaging data, black-and-white imaging data, color imaging data, or other types of imaging data. Further, the imaging sensors 234 may capture data associated with movement, positions, or other changes to various objects within the trailer 104. In some examples, the imaging sensors 234 may operate substantially continuously, intermittently, or according to a schedule. In other examples, the imaging sensors 234 may be triggered or initiated to operate based on data captured by various other sensors of the sensor package 105.

In example embodiments, based on data captured by one or more of the mmWave radar sensors 220, Bluetooth sensors 222, ultra-wideband communication devices 224, inertial measurement units and/or accelerometers 230, temperature sensors 232, and/or other sensors or components of the sensor package 105, the imaging sensors 234 may be triggered or initiated to capture imaging data related to any movement, positions, or other changes to various objects within the trailer 104. Moreover, captured data related to various errors or events, such as movement or positions of objects, opening/closing of doors, incorrect loading or unloading of objects, shifting, leaning, or falling over of objects, hazardous temperatures, or other events, may be stored in the memories 212 and/or processed by the processors 210.

The microphones or other audio input devices 236 may comprise various types of microphones, vibration detection diaphragms, piezoelectric devices, or other audio input devices configured to capture audio data of an interior of a trailer 104. For example, the microphones 236 may capture audio data associated with movement, positions, or other changes to various objects within the trailer 104. In some examples, the microphones 236 may operate substantially continuously, intermittently, or according to a schedule. In other examples, the microphones 236 may be triggered or initiated to operate based on data captured by various other sensors of the sensor package 105.

In example embodiments, based on data captured by one or more of the mmWave radar sensors 220, Bluetooth sensors 222, ultra-wideband communication devices 224, inertial measurement units and/or accelerometers 230, temperature sensors 232, and/or other sensors or components of the sensor package 105, the microphones 236 may be triggered or initiated to capture audio data related to any movement, positions, or other changes to various objects within the trailer 104. Moreover, captured data related to various errors or events, such as movement or positions of objects, opening/closing of doors, incorrect loading or unloading of objects, shifting, leaning, or falling over of objects, hazardous temperatures, or other events, may be stored in the memories 212 and/or processed by the processors 210.

The lights, speakers, or other visual/audio output devices 238 may comprise various screens, displays, projection devices, lights, visual beacons, speakers, horns, alarms, or other visual and/or audio output devices. The various visual/audio output devices 238 may emit or present various alerts, information, and/or instructions based on captured and/or processed data associated with movement, positions, or other changes to various objects within the trailer 104.

In example embodiments, based on data captured by one or more of the mmWave radar sensors 220, Bluetooth sensors 222, ultra-wideband communication devices 224, inertial measurement units and/or accelerometers 230, temperature sensors 232, and/or other sensors or components of the sensor package 105, the visual/audio output devices 238 may be triggered or initiated to emit, present, or output various alerts, information, and/or instructions related to any movement, positions, or other changes to various objects within the trailer 104. Further, such alerts, information, and/or instructions may also be transmitted to various other devices, such as portable communication devices, warehouse management systems, or other computers or control systems, via various communication devices associated with the sensor package 105.

The cellular communication devices 226 may comprise various types of communication devices, such as long term evolution (LTE), 4G, 5G, satellite, or other types of cellular communication devices. The cellular communication devices 226 may enable transfer of data, information, and/or instructions between the freight sensor package 105 and remote computing resources, e.g., a control system, processors, memories, or other cloud storage or processing, via cellular towers, cellular nodes, satellites, or other cellular communication connections. The various data, information, and/or instructions may comprise various data from sensors onboard the sensor package 105, information or instructions generated by processing the data onboard the sensor package 105, and/or information or instructions generated by remote computing resources, e.g., based on sensor data received from the sensor package 105.

In additional examples, the freight sensor package 105 may also include other high bandwidth communication devices, such as WiFi or other wireless communication devices. For example, the high bandwidth communication devices may generally communicate wirelessly with routers, access points, or WiFi communication devices that may be associated with ground stations, communication stations or hubs, material handling facilities, or other generally fixed locations. The high bandwidth communication devices may also enable transfer of data, information, and/or instructions between the freight sensor package 105 and remote computing resources, e.g., a control system, processors, memories, or other cloud storage or processing, including various data from sensors onboard the sensor package 105, information or instructions generated by processing the data onboard the sensor package 105, and/or information or instructions generated by remote computing resources, e.g., based on sensor data received from the sensor package 105.

The long range communication devices 228 may comprise various types of communication devices, such as wide area network (WAN) devices, long range wide area network (LoRaWAN) devices, or other types of long range communication devices. The long range communication devices 228 may enable transfer of data, information, and/or instructions between the freight sensor package 105 and other sensor packages in communication range. In addition, the long range communication devices 228 may enable transfer of data, information, and/or instructions between the freight sensor package 105 and ground stations, communication stations or hubs, material handling facilities, or other generally fixed locations. The various data, information, and/or instructions may comprise various data from sensors onboard the sensor package 105, information or instructions generated by processing the data onboard the sensor package 105, and/or information or instructions generated by remote computing resources, e.g., based on sensor data received from the sensor package 105.

In some example embodiments, the freight sensor package 105 may select or choose among the various available communication devices, e.g., based on power consumption, compute power, memory usage, bandwidth requirements, or other factors. For example, the sensor package 105 may transfer data or information using high bandwidth communication devices when the sensor package 105 is in communication range with one or more routers, access points, or WiFi communication devices, e.g., associated with ground stations, communication stations or hubs, material handling facilities, or other generally fixed locations. In addition, if high bandwidth communication connections are not available, the sensor package 105 may transfer data or information using cellular communication devices 226, e.g., via cellular towers, satellites, or other cellular communication points. However, the high bandwidth communication devices and/or the cellular communication devices 226 may generally be associated with high power consumption, high compute power, and/or high memory usage. Further, if high bandwidth and/or cellular communication connections are not available and/or may utilize too much power, compute, and/or memory, the sensor package 105 may transfer data or information using long range communication devices 228.

The long range communication devices 228 may generate or create a peer-to-peer, long range mesh communication network among a plurality of freight sensor packages 105 that may be associated with various trailers 104 or other freight or shipping containers. For example, a plurality of sensor packages 105 associated with respective trailers 104 on a road network within a region may form a long range mesh communication network, and data or information may be transferred between and among the plurality of sensor packages 105, and eventually to remote computing resources, e.g., via high bandwidth and/or cellular communication devices. In this manner, connectivity of substantially all sensor packages 105 associated with respective trailers 104 may be maintained over time via the combination of available communication devices using different communication networks. Specifically, even in the absence of high bandwidth and/or cellular communication connections, a sensor package 105 may nonetheless remain in communication with other sensor packages in relative geographic proximity via the long range communication devices 228.

Using the example freight sensor package 105 described herein at least with respect to FIG. 2, various data of items, packages, carts, containers, agents, or other objects may be captured and processed onboard the sensor package 105, and/or may be transmitted to remote computing resources for further processing. In addition, loading, transporting, and/or unloading processes may be observed or monitored and compared to various rules or procedures in order to ensure accurate, efficient, and safe operations. Further, various data, information, and/or instructions may be transmitted between the sensor package 105 and other control systems, material handling facilities, or remote computing resources to ensure efficient, reliable, and safe operations.

Although FIG. 2 illustrates a particular type, number, configuration, or arrangement of various processors, memories, sensors, communication devices, visual/audio input/output devices, or other components of an example freight sensor package, other example embodiments may include various other types, numbers, configurations, arrangements, or combinations of various processors, memories, sensors, communication devices, visual/audio input/output devices, or other components.

Figure 3:
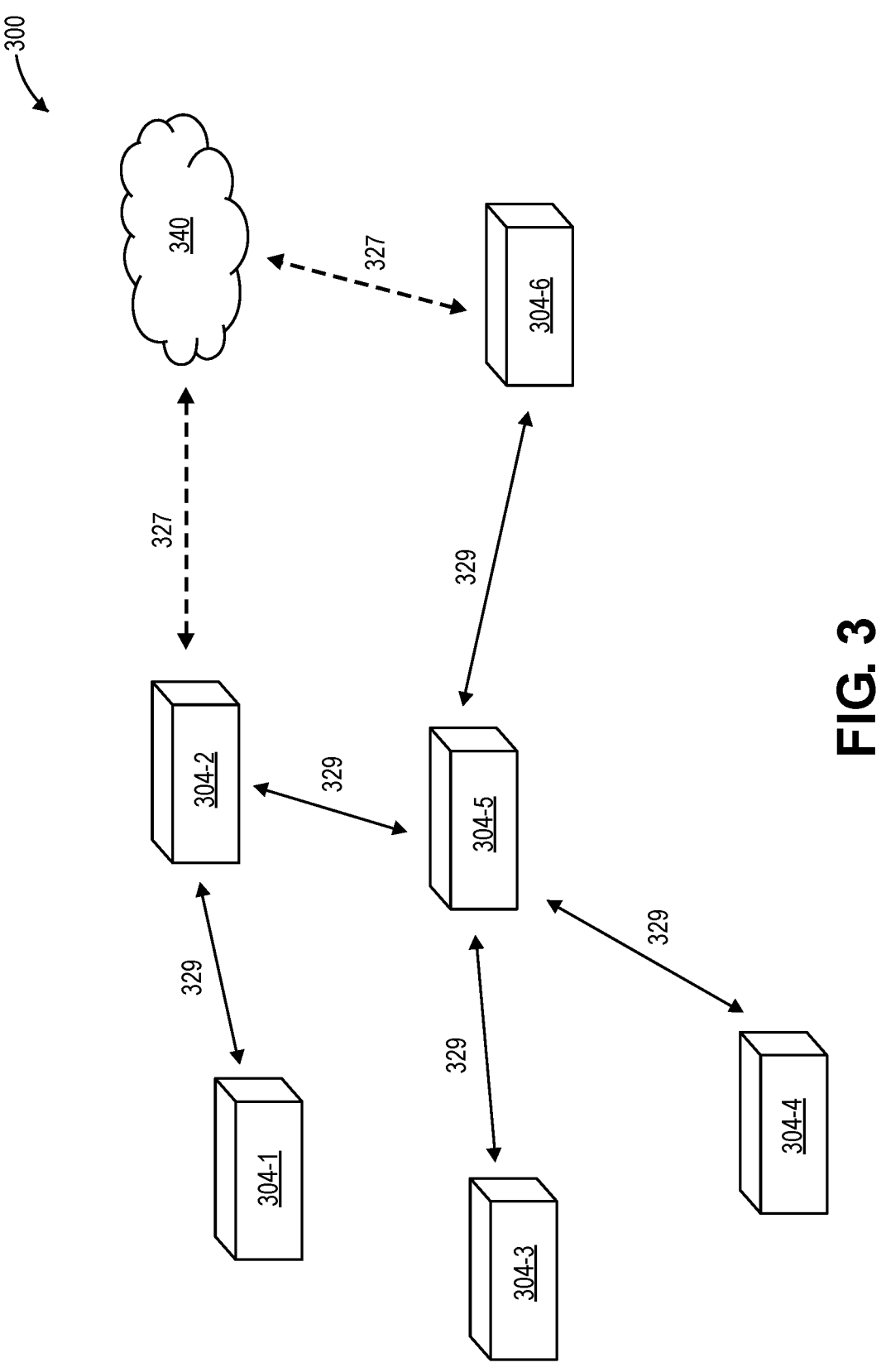
FIG. 3 is a schematic diagram of an example mesh communication network of trailers having freight sensor packages, in accordance with implementations of the present disclosure.

FIG. 3 is a schematic diagram 300 of an example mesh communication network of trailers having freight sensor packages, in accordance with implementations of the present disclosure.

As shown in FIG. 3, various trailers 304 or containers having associated freight sensor packages may be on a road network or within a geographic area. Each of the trailers 304-1, 304-2, 304-3, 304-4, 304-5, 304-6 may be moving or stationary within the geographic area, and respective sensor packages may capture data using various sensors, which data may be stored and at least partially processed onboard the sensor packages, as further described herein at least with respect to FIG. 2.

In the example of FIG. 3, only some of the trailers 304 may have high bandwidth and/or cellular communication connections 327 to remote computing resources 340, e.g., control systems, material handling facilities, and/or cloud storage and/or processing. For example, trailers 304-2, 304-6 may have high bandwidth and/or cellular communication connections 327 to remote computing resources 340. Using such high bandwidth and/or cellular connections 327, data and information may be transferred between the trailers 304-2, 304-6 and the remote computing resources 340 in order to substantially continuously monitor the trailers 304-

2, 304-6. In other example embodiments, instead of trailers 304-2, 304-6, the points or locations having high bandwidth and/or cellular connections 327 to remote computing resources 340 may comprise ground stations, communication stations or hubs, material handling facilities, or other generally fixed locations.

The remaining trailers 304 shown in FIG. 3 may not have available high bandwidth and/or cellular communication connections to remote computing resources 340. However, trailers 304-1, 304-3, 304-4, 304-5 may have long range communication connections 329 with at least one other trailer. For example, trailer 304-1 may have a long range communication connection with trailer 304-2, trailers 304-3, 304-4 may have long range communication connections with trailer 304-5, and trailer 304-5 may have long range communication connections with trailers 304-2, 304-6. Using this peer-to-peer, long range mesh communication network among the plurality of trailers 304, each individual trailer 304 may have at least an indirect communication connection to the remote computing resources 340. As a result, using such combination of long range connections 329 and high bandwidth and/or cellular connections 327, data and information may be transferred between individual trailers that are in long range communication with each other, and ultimately with the remote computing resources 340 via trailers (or ground stations) having high bandwidth and/or cellular connections, in order to substantially continuously receive data from, send data to, and maintain connectivity with all trailers 304-1, 304-2, 304-3, 304-4, 304-5, 304-6 within the geographic area.

Although FIG. 3 illustrates a particular type, number, configuration, or arrangement of various trailers or containers having freight sensor packages, other example embodiments of peer-to-peer, long range mesh communication networks may include various other types, numbers, configurations, arrangements, or combinations of various trailers or containers having freight sensor packages, ground stations, access points, control systems, material handling facilities, other generally fixed locations, cellular towers, satellites, or other communication stations or hubs.

Figure 4:
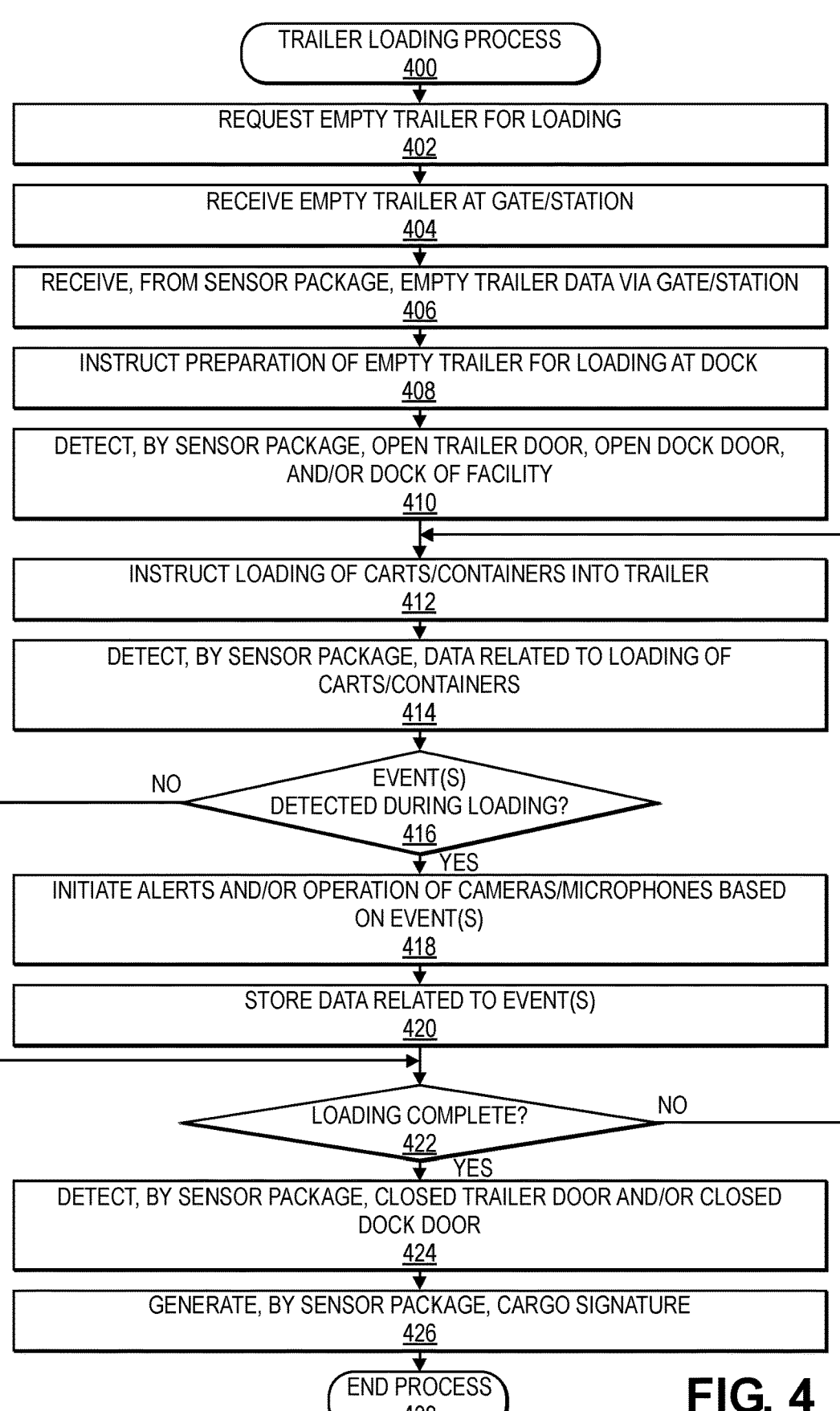
FIG. 4 is a flow diagram illustrating an example trailer loading process, in accordance with implementations of the present disclosure.

FIG. 4 is a flow diagram illustrating an example trailer loading process 400, in accordance with implementations of the present disclosure.

The process 400 may begin by requesting an empty trailer for loading, as at 402. For example, one or more empty trailers may be present within a yard or proximate a material handling facility. From available empty trailers, an empty trailer may be identified and selected for loading at a dock of the facility, e.g., based on various requirements such as type, size, capacity, carrier, or other attributes. Further, a control system may command or instruct requesting an empty trailer for loading.

The process 400 may continue by receiving the empty trailer at a gate/station, as at 404. For example, the identified and selected empty trailer may be moved to a gate, station, access point, communication hub, or other location within the yard. In addition, a tractor, truck, cab, van, or other vehicle may engage and move the empty trailer. Further, a control system may command or instruct receiving the empty trailer at a gate, station, or other location.

The process 400 may proceed by receiving, from a sensor package, empty trailer data via the gate/station, as at 406. For example, a freight sensor package associated with the empty trailer may capture and store data associated with the empty trailer. In some examples, the data may comprise a cargo signature related to the empty trailer, which may include data from various sensors of the sensor package, e.g., at least data from the mmWave radar sensor indicating that the trailer is empty. At a gate, station, access point, communication hub, or other location within the yard, the cargo signature related to the empty trailer may be received. Further, a control system may command or instruct receiving empty trailer data from the sensor package via a gate, station, or other location.

The process 400 may continue to instruct preparation of the empty trailer for loading at the dock, as at 408. For example, the empty trailer may be moved to a dock for loading, e.g., by a tractor, truck, cab, van, or other vehicle. In addition, the empty trailer may be engaged or coupled with the dock, e.g., via a trailer lock or restraint, and various other tasks may be performed to prepare the trailer for loading, such as opening trailer doors, opening a dock door, extending a dock leveler or ramp into the trailer, connecting the trailer and sensor package to external power, providing light, temperature control, and/or air circulation within the trailer, and/or various other tasks. Further, a control system may command or instruct preparing the empty trailer for loading at the dock.

The process 400 may proceed to detect, by the sensor package, an open trailer door, open dock door, and/or dock of the facility, as at 410. For example, using at least the mmWave radar sensor onboard the sensor package, opening of the trailer door, opening of the dock door, and/or portions of the interior of the dock may be detected. In some examples, in response to detecting opening of trailer and/or dock doors, imaging sensors and/or microphones of the sensor package may also be initiated to capture visual and/or audio data associated with the empty trailer, e.g., as confirmation that the empty trailer is prepared for loading. Data captured by various sensors of the sensor package may be transmitted to remote computing resources via various communication connections, such as cellular and/or high bandwidth connections. If the empty trailer is not correctly or fully prepared for loading based on the captured data, various alerts, information, and/or instructions may be emitted or presented via the visual and/or audio output devices of the sensor package. Further, a control system may command or instruct detecting open trailer and/or dock doors and completed preparation of the empty trailer for loading.

The process 400 may continue with instructing loading of carts/containers into the trailer, as at 412. For example, various items, packages, carts, containers, or other objects may be loaded into the trailer, e.g., for transport to a destination. The objects may be loaded using various manual, semi-automatic, and/or automatic processes, equipment, machines, or systems. In some examples, various objects may include Bluetooth beacons or devices, and/or ultra-wideband communication devices to facilitate communication with corresponding sensors of the sensor package associated with the trailer. Further, a control system may command or instruct loading of various objects into the trailer.

The process 400 may proceed with detecting, by the sensor package, data related to loading of the carts/containers, as at 414. For example, during loading, the mmWave radar sensor, the Bluetooth sensor, and/or the ultra-wideband communication device of the sensor package may detect or monitor movement and/or positions of loaded objects. For example, the mmWave radar sensor may detect movement and positions of loaded objects within the trailer based on time of flight of emitted signals. In addition, the Bluetooth sensor may detect proximity or presence of various Bluetooth beacons or similar devices associated with loaded objects within the trailer. Moreover, the ultra-wideband communication device may detect movement and positions by communicating with corresponding ultra-wideband communication devices associated with loaded objects within the trailer. Furthermore, the temperature sensor of the sensor package may detect temperature or other environment data within the trailer. Further, a control system may command or instruct detecting data related to loading of objects into the trailer.

The process 400 may continue by determining whether any events are detected during loading, as at 416. For example, various errors or events may occur during loading processes, such as incorrect objects loaded into a trailer, incorrect or hazardous loading procedures, unsafe or hazardous temperatures or environment conditions during loading, and/or other errors or events. Incorrect objects loaded into a trailer may be determined based on identifiers of the objects, which may be detected by the Bluetooth sensor and/or the ultra-wideband communication device. Incorrect loading procedures may include moving objects too quickly, moving multiple objects simultaneously, too many agents and/or objects simultaneously within the trailer, incorrect positioning of objects, stacking objects loosely or incorrectly, and/or various other events that may be detected by the mmWave radar sensor, the Bluetooth sensor, and/or the ultra-wideband communication device. Further, a control system may command or instruct determining whether any events are detected during loading.

If one or more events are detected during loading, the process 400 may proceed by initiating alerts and/or operation of cameras/microphones based on the events, as at 418. For example, in response to detecting one or more events during loading of objects into the trailer, one or more visual and/or audio output devices may be initiated to emit alerts and/or provide information or instructions to identify and correct errors or events. In addition, in response to detecting one or more events during loading of objects into the trailer, imaging sensors and/or microphones of the sensor package may be initiated to capture visual and/or audio data associated with the loaded objects, loading procedures, and/or loading conditions. Various errors or events may be corrected based on such alerts and information before or during continuation of the loading processes. Further, a control system may command or instruct initiating alerts and/or capturing additional data based on errors or events.

The process 400 may then continue to store the data related to the events, as at 420. For example, data captured by various sensors of the sensor package related to events during loading processes, as well as corrections to such events, may be stored in onboard memories, and/or may be at least partially processed using onboard processors. In addition, data captured by the various sensors of the sensor package may be transmitted to remote computing resources via various communication connections, such as cellular and/or high bandwidth connections. Further, a control system may command or instruct storing and/or transmitting the data related to events during loading processes.

After storing data related to the events, and/or if one or more events are not detected during loading, the process 400 may proceed to determine whether loading is complete, as at 422. For example, it may be determined whether all objects intended for loading into the trailer have been loaded, and/or whether errors or events detected during loading have been corrected. Further, a control system may command or instruct determining whether loading is complete.

If loading is not yet complete, the process 400 may return to step 412 to continue loading various objects into the trailer. If, however, loading is complete, the process 400 may continue with detecting, by the sensor package, a closed trailer door and/or closed dock door, as at 424. For example, using at least the mmWave radar sensor onboard the sensor package, closing of the trailer door and/or closing of the dock door may be detected. Based on closing of the trailer and/or dock doors, it may be determined that the trailer may be disengaged or released from the dock, and moved for transport to a destination. Further, a control system may command or instruct detecting closed trailer and/or dock doors, as well as determining whether preparation for transport of the trailer is completed.

The process 400 may then proceed with generating, by the sensor package, a cargo signature, as at 426. For example, in response to detecting closing of trailer and/or dock doors and completed preparation for transport of the trailer, data related to objects loaded into an interior of the trailer may be captured and stored. In some examples, the data may comprise a cargo signature related to the loaded trailer, which may include data from the mmWave radar sensor related to the loaded objects within the trailer. In additional examples, various data from other sensors, such as the Bluetooth sensor, ultra-wideband communication device, and/or imaging sensor, may be combined with data from the mmWave radar sensor to generate the cargo signature. At a gate, station, access point, communication hub, or other location within the yard, the cargo signature related to the loaded trailer may be received, and the cargo signature may also be transmitted via various communication connections, such as cellular and/or high bandwidth connections, to remote computing resources for monitoring, storage, or further processing. Further, a control system may command or instruct generating a cargo signature associated with a loaded trailer.

The process 400 may then end, as at 428.

Using the freight sensor package described herein, various errors or events related to loading processes may be detected by various onboard sensors, and alerts or information may be provided to correct such errors or events. Further, upon completion of loading processes, the freight sensor package may generate a cargo signature of the loaded objects within the trailer, and the cargo signature may be utilized during subsequent monitoring of the loaded trailer, e.g., during transport and/or unloading processes.

Figure 5:
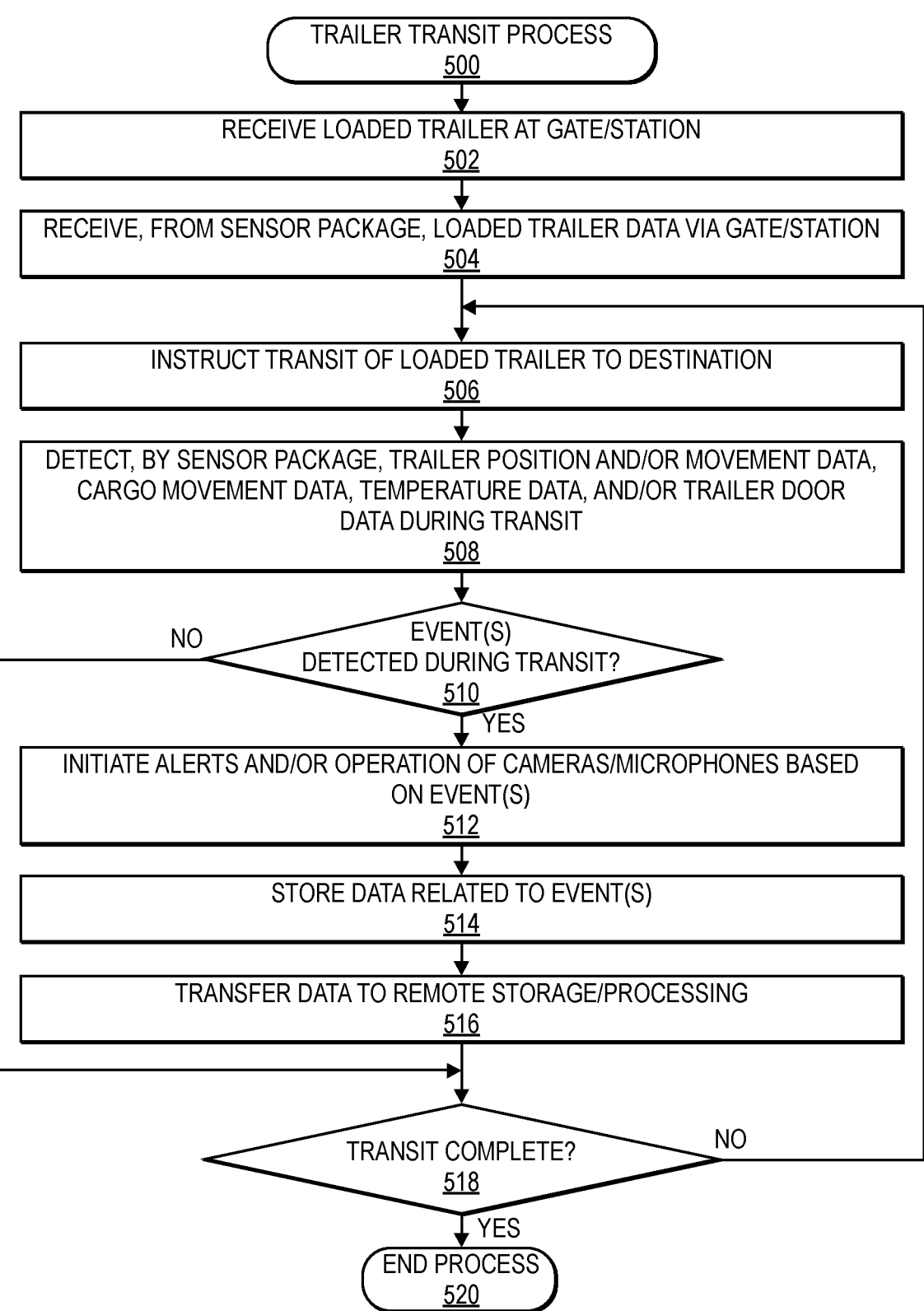
FIG. 5 is a flow diagram illustrating an example trailer transit process, in accordance with implementations of the present disclosure.

FIG. 5 is a flow diagram illustrating an example trailer transit process 500, in accordance with implementations of the present disclosure.

The process 500 may begin by receiving a loaded trailer at a gate/station, as at 502. For example, the loaded trailer may be moved to a gate, station, access point, communication hub, or other location within the yard. In addition, a tractor, truck, cab, van, or other vehicle may engage and move the loaded trailer for departure from a source or loading location. Further, a control system may command or instruct receiving the loaded trailer at a gate, station, or other location.

The process 500 may continue by receiving, from a sensor package, loaded trailer data via the gate/station, as at 504. For example, a freight sensor package associated with the loaded trailer may have captured and stored data associated with the loaded trailer, e.g., a cargo signature of the loaded trailer. In addition, various other data may have been captured by sensors onboard the sensor package during the loading processes, e.g., related to errors or events, and any corrections thereof. At a gate, station, access point, communication hub, or other location within the yard, the cargo signature related to the loaded trailer, and/or various other data stored in the sensor package, may be received. Further, a control system may command or instruct receiving loaded trailer data from the sensor package via a gate, station, or other location.

The process 500 may proceed by instructing transit of the loaded trailer to a destination, as at 506. For example, a driver may operate the tractor, truck, cab, van, or other vehicle in order to transport the loaded trailer from the material handling facility to a destination location, e.g., a customer, other facility, or other location. In addition, the driver may carry a portable communication device, via which the driver may receive various alerts, information, and/or instructions. Further, a control system may command or instruct transit of the loaded trailer to a destination.

The process 500 may continue to detect, by the sensor package, trailer position and/or movement data, cargo movement data, temperature data, and/or trailer door data during transit, as at 508. For example, during transport processes, various sensors onboard the sensor package may monitor or detect any position, movement, or other changes to the trailer, loaded objects, and/or aspects or conditions inside the trailer. The GPS/GNSS receivers of the sensor package may receive position data during transport of the trailer. The inertial measurement unit and/or accelerometer of the sensor package may detect acceleration, turns, impacts or accidents, or other changes to movement of the trailers. The mmWave radar sensor, the Bluetooth sensor, and/or the ultra-wideband communication device of the sensor package may detect or monitor movement and/or positions of loaded objects within the trailer, and may compare such data with the cargo signature of the loaded trailer to determine differences or changes.

For example, the mmWave radar sensor may detect movement and positions of loaded objects within the trailer based on time of flight of emitted signals. The mmWave radar sensor may also detect opening and/or closing of trailer doors during transport. In addition, the Bluetooth sensor may detect proximity or presence of various Bluetooth beacons or similar devices associated with loaded objects within the trailer. Moreover, the ultra-wideband communication device may detect movement and positions by communicating with corresponding ultra-wideband communication devices associated with loaded objects within the trailer. Furthermore, the temperature sensor of the sensor package may detect temperature or other environment data within the trailer during transit. Further, a control system may command or instruct detecting data related to the trailer, loaded objects, and/or conditions inside the trailer during transit.

The process 500 may proceed to determine whether any events are detected during transit, as at 510. For example, various errors or events may occur during transport processes, such as incorrect routes during transport, impacts, accidents, vibration, or other accelerations experienced by the trailer and loaded objects, shifting, movement, or falling over of objects loaded into the trailer, unauthorized opening of trailer doors, unauthorized entry by agents into the trailer, unauthorized movement, placement, and/or removal of loaded objects within the trailer, unsafe or hazardous temperatures or environment conditions during transport, and/or other errors or events. Incorrect routes may be determined based on location data, which may be detected by GPS/GNSS receivers. Impacts, accidents, or other accelerations may be determined based on data detected by inertial measurement units and/or accelerometers.

Shifting or movement of loaded objects may be determined based on data detected by the mm Wave radar sensor and/or the ultra-wideband communication device, which may be compared with the cargo signature of the loaded trailer. Unauthorized opening of trailer doors may be determined based on data detected by the mmWave radar sensor. Unauthorized entry by agents and/or unauthorized movement of loaded objects may be determined based on data detected by the mm Wave radar sensor, the Bluetooth sensor, and/or the ultra-wideband communication device, which may be compared with the cargo signature of the loaded trailer. Generally, the determination of errors or events during transit may be performed using processors and memories onboard the sensor package. Further, a control system may command or instruct determining whether any events are detected during transit.

If one or more events are detected during transit, the process 500 may continue with initiating alerts and/or operation of cameras/microphones based on the events, as at 512. For example, in response to detecting one or more events during transport of loaded objects within the trailer, one or more visual and/or audio output devices may be initiated to emit alerts and/or provide information or instructions to identify or correct errors or events. The alerts or information may be provided to a driver, e.g., via a portable communication device, or other agents, control systems, facilities, or associated personnel, and/or the alerts or information may be stored in onboard memories of the sensor package. In addition, in response to detecting one or more events during transport of loaded objects within the trailer, imaging sensors and/or microphones of the sensor package may be initiated to capture visual and/or audio data associated with trailer routes, accelerations or impacts, movement, positions, or changes to loaded objects, unauthorized opening, entry, and/or movement during transport, and/or environment conditions during transport. Various errors or events may be corrected based on such alerts and information during transport processes, e.g., by modifying driving routes or operations, stopping or pausing and performing corrections to aspects of the trailer and/or loaded objects, and/or various other actions or corrections. Generally, the processing of sensor data, as well as determination of corrective or triggered actions, during transit may be performed using processors and memories onboard the sensor package. Further, a control system may command or instruct initiating alerts and/or capturing additional data based on errors or events.

The process 500 may then proceed with storing the data related to the events, as at 514. For example, data captured by various sensors of the sensor package related to events during transport processes, as well as any identifications or corrections to such events, may be stored in onboard memories, and/or may be at least partially processed using onboard processors. The data related to events may be stored to facilitate efficient, reliable, and safe unloading processes for the trailer upon arrival at the destination location. Further, a control system may command or instruct storing the data related to events during transport processes.

The process 500 may continue by transferring data to remote storage/processing, as at 516. For example, if a high bandwidth communication connection is available, e.g., via a ground station, access point, communication hub, or other generally fixed location, at least some of the data captured by various sensors of the sensor package may be transmitted to remote computing resources for storage and/or further processing. Alternatively, if a cellular communication connection is available, e.g., via a cellular tower or satellite connection, at least some of the data captured by various sensors of the sensor package may be transmitted to remote computing resources for storage and/or further processing. However, such high bandwidth and/or cellular communication connections may require generally high power, high compute, and/or high memory usage by the sensor package, and depending on current power, compute, and/or memory capacity or attributes, the sensor package may not transmit data via such connections even if available.

Furthermore, if a peer-to-peer, long range mesh communication network connection is available, e.g., with another sensor package associated with another trailer or other long range communication device, at least some of the data captured by various sensors of the sensor package may be transmitted to remote computing resources for storage and/or further processing. Such long range mesh communication network connections may require generally low power, low compute, and/or low memory usage by the sensor package, such that transfer of data using such mesh network connections may be preferred during transport processes. Alternatively, in order to save or conserve power, compute, and/or memory of the sensor package, data may not be transmitted via any available communication connections during transport processes, and instead, the data may be stored in onboard memories and/or processed by onboard processors until the trailer arrives at a destination location. Further, a control system may command or instruct transmitting the data related to events during transport processes.

After storing and/or transmitting data related to the events, and/or if one or more events are not detected during transport, the process 500 may proceed by determining whether transit is complete, as at 518. For example, it may be determined whether the tractor, trailer, loaded objects, and associated sensor package have arrived at the destination location, e.g., based on data from GPS/GNSS receivers or other location/position data. Further, a control system may command or instruct determining whether transit is complete.

If transit is not yet complete, the process 500 may return to step 506 to continue instructing transit of the loaded trailer to the destination location. If, however, transit is complete, the process 500 may then end, as at 520.

Using the freight sensor package described herein, various errors or events related to transit or transport processes may be detected by various onboard sensors, and alerts or information may be provided to identify or correct such errors or events. Further, captured data from various sensors onboard the sensor package may be stored in onboard memories and/or processed by onboard processors during transport. In some examples, data related to events during transport processes may be transmitted to remote computing resources for storage and/or further processing.

Figure 6B:
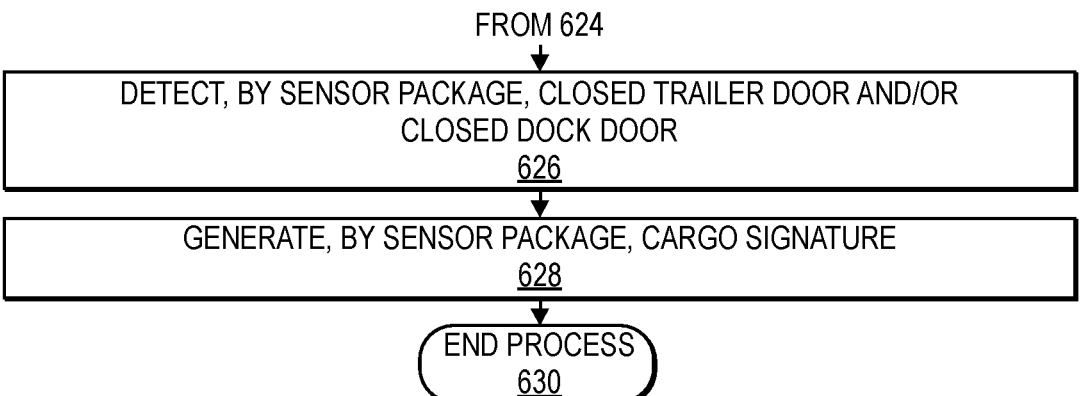

FIG. 6A-6B is a flow diagram illustrating an example trailer unloading process 600, in accordance with implementations of the present disclosure.

The process 600 may begin by receiving a loaded trailer at a gate/station, as at 602. For example, the loaded trailer may have been transported from a source location to a destination location, e.g., a material handling facility or yard having an associated gate, station, access point, communication hub, or other location within the yard. In addition, a tractor, truck, cab, van, or other vehicle may have engaged and transported the loaded trailer. Further, a control system may command or instruct receiving the loaded trailer at a gate, station, or other location.

The process 600 may continue by receiving, from a sensor package, loaded trailer data via the gate/station, as at 604. For example, a freight sensor package associated with the loaded trailer may have captured and stored data associated with the loaded trailer, e.g., a cargo signature of the loaded trailer. In addition, various other data may have been captured by sensors onboard the sensor package during the loading and/or transport processes, e.g., related to errors or events, and any identifications or corrections thereof. At a gate, station, access point, communication hub, or other location within the yard, the cargo signature related to the loaded trailer, and/or various other data related to errors or events stored in the sensor package, may be received. Moreover, various additional processing may be performed upon the data received from the loaded trailer related to events during loading and/or transport processes, in order to detect any errors, events, or other anomalies. Further, a control system may command or instruct receiving loaded trailer data from the sensor package via a gate, station, or other location.

The process 600 may proceed by determining whether any events were detected during transit that affect unloading, as at 606. For example, various events may have been detected during transport processes, including impacts, accidents, vibration, or other accelerations experienced by the trailer and loaded objects, shifting, movement, or falling over of objects loaded into the trailer, unauthorized opening of trailer doors, unauthorized entry by agents into the trailer, unauthorized movement, placement, and/or removal of loaded objects within the trailer, unsafe or hazardous temperatures or environment conditions during transport, and/or other errors or events. Some of the detected events may affect unloading processes, e.g., objects that may have shifted, fallen over, or be leaning against trailer doors may make portions of unloading processes hazardous or unsafe, and/or unauthorized opening, entry, and/or movement within trailers during transport may require additional inspection or other verification tasks prior to continuing with unloading processes. Various other detected events may also affect or require specialized unloading processes. Further, a control system may command or instruct determination of whether any events were detected during transit that affect unloading.

If any events were detected during transit that affect unloading, the process 600 may continue to instruct additional processing related to unloading based on the detected events, as at 608. For example, if opening of trailer doors may be unsafe or hazardous, various specialized equipment, agents, or processes may be used or implemented to safely open the trailer doors. In addition, if unauthorized activities were detected, additional inspection or verification of portions of the loaded objects within the trailer may be performed. Moreover, various data captured by the sensors of the sensor package may be provided to facilitate determination of any needed additional processing of the loaded trailer. Also, imaging sensors and/or microphones of the sensor package may also be initiated to capture data related to current state of loaded objects within the trailer, which may further facilitate determination of any needed additional processing of the loaded trailer. Further, a control system may command or instruct additional processing based on detected events.

After instructing additional processing based on the detected events, and/or if one or more events are not detected during transit that affect unloading, the process 600 may proceed to instruct preparation of the loaded trailer for unloading at a dock, as at 610. For example, the loaded trailer may be moved to a dock for unloading, e.g., by a tractor, truck, cab, van, or other vehicle. In addition, the loaded trailer may be engaged or coupled with the dock, e.g., via a trailer lock or restraint, and various other tasks may be performed to prepare the trailer for unloading, such as opening trailer doors, opening a dock door, extending a dock leveler or ramp into the trailer, connecting the trailer and sensor package to external power, providing light, temperature control, and/or air circulation within the trailer, and/or various other tasks. Further, a control system may command or instruct preparing the loaded trailer for unloading at the dock.

The process 600 may continue with detecting, by the sensor package, an open trailer door, open dock door, and/or dock of the facility, as at 612. For example, using at least the mmWave radar sensor onboard the sensor package, opening of the trailer door, opening of the dock door, and/or portions of the interior of the dock may be detected. In some examples, in response to detecting opening of trailer and/or dock doors, imaging sensors and/or microphones of the sensor package may also be initiated to capture visual and/or audio data associated with the loaded trailer, e.g., as confirmation that the loaded trailer is prepared for unloading. Data captured by various sensors of the sensor package may be transmitted to remote computing resources via various communication connections, such as cellular and/or high bandwidth connections. If the loaded trailer is not correctly or fully prepared for unloading based on the captured data, various alerts, information, and/or instructions may be emitted or presented via the visual and/or audio output devices of the sensor package. Further, a control system may command or instruct detecting open trailer and/or dock doors and completed preparation of the loaded trailer for unloading.

The process 600 may proceed with instructing unloading of carts/containers from the trailer, as at 614. For example, various items, packages, carts, containers, or other objects may be unloaded from the trailer, e.g., for transfer, sorting, storage, or other processing within the facility. The objects may be unloaded using various manual, semi-automatic, and/or automatic processes, equipment, machines, or systems. In some examples, various objects may include Bluetooth beacons or devices, and/or ultra-wideband communication devices to facilitate communication with corresponding sensors of the sensor package associated with the trailer. Further, a control system may command or instruct unloading of various objects from the trailer.

The process 600 may continue by detecting, by the sensor package, data related to unloading of the carts/containers, as at 616. For example, during unloading, the mmWave radar sensor, the Bluetooth sensor, and/or the ultra-wideband communication device of the sensor package may detect or monitor movement and/or positions of unloaded objects. For example, the mmWave radar sensor may detect movement and positions of unloaded objects from within the trailer based on time of flight of emitted signals. In addition, the Bluetooth sensor may detect proximity, presence, and/or removal of various Bluetooth beacons or similar devices associated with unloaded objects within the trailer. Moreover, the ultra-wideband communication device may detect movement and positions by communicating with corresponding ultra-wideband communication devices associated with unloaded objects within the trailer. Furthermore, the temperature sensor of the sensor package may detect temperature or other environment data within the trailer. Further, a control system may command or instruct detecting data related to unloading of objects from the trailer.

The process 600 may proceed by determining whether any events are detected during unloading, as at 618. For example, various errors or events may occur during unloading processes, such as incorrect objects unloaded from a trailer, incorrect or hazardous unloading procedures, unsafe or hazardous temperatures or environment conditions during unloading, and/or other errors or events. Incorrect objects unloaded from a trailer may be determined based on identifiers of the objects that should remain in the trailer, e.g., for transport to a next destination, which may be detected by the Bluetooth sensor and/or the ultra-wideband communication device. Incorrect unloading procedures may include moving objects too quickly, moving multiple objects simultaneously, too many agents and/or objects simultaneously within the trailer, incorrect sequencing of unloaded objects, and/or various other events that may be detected by the mm Wave radar sensor, the Bluetooth sensor, and/or the ultra-wideband communication device. Further, a control system may command or instruct determining whether any events are detected during unloading.

If one or more events are detected during loading, the process 600 may continue to initiate alerts and/or operation of cameras/microphones based on the events, as at 620. For example, in response to detecting one or more events during unloading of objects from the trailer, one or more visual and/or audio output devices may be initiated to emit alerts and/or provide information or instructions to identify and correct errors or events. In addition, in response to detecting one or more events during unloading of objects from the trailer, imaging sensors and/or microphones of the sensor package may be initiated to capture visual and/or audio data associated with the unloaded objects, unloading procedures, and/or unloading conditions. Various errors or events may be corrected based on such alerts and information before or during continuation of the unloading processes. Further, a control system may command or instruct initiating alerts and/or capturing additional data based on errors or events.

The process 600 may then proceed to store the data related to the events, as at 622. For example, data captured by various sensors of the sensor package related to events during unloading processes, as well as corrections to such events, may be stored in onboard memories, and/or may be at least partially processed using onboard processors. In addition, data captured by the various sensors of the sensor package may be transmitted to remote computing resources via various communication connections, such as cellular and/or high bandwidth connections. Further, a control system may command or instruct storing and/or transmitting the data related to events during unloading processes.

After storing data related to the events, and/or if one or more events are not detected during unloading, the process 600 may continue with determining whether unloading is complete, as at 624. For example, it may be determined whether all objects intended for unloading from the trailer have been unloaded, and/or whether errors or events detected during unloading have been corrected. Further, a control system may command or instruct determining whether unloading is complete.

If unloading is not yet complete, the process 600 may return to step 614 to continue unloading various objects from the trailer. If, however, unloading is complete, the process 600 may proceed with detecting, by the sensor package, a closed trailer door and/or closed dock door, as at 626. For example, using at least the mmWave radar sensor onboard the sensor package, closing of the trailer door and/or closing of the dock door may be detected. Based on closing of the trailer and/or dock doors, it may be determined that the trailer may be disengaged or released from the dock, and moved for transport to a storage location, next destination, or other location. Further, a control system may command or instruct detecting closed trailer and/or dock doors and completed unloading of the trailer.

The process 600 may then continue by generating, by the sensor package, a cargo signature, as at 628. For example, in response to detecting closing of trailer and/or dock doors and completed unloading of the trailer at the destination location, data related to any objects remaining inside an interior of the trailer, and/or data related to an empty trailer if the trailer was fully unloaded, may be captured and stored. In some examples, the data may comprise a cargo signature related to remaining objects inside the trailer, which may include data from the mmWave radar sensor related to the objects within the trailer. In additional examples, various data from other sensors, such as the Bluetooth sensor, ultra-wideband communication device, and/or imaging sensor, may be combined with data from the mmWave radar sensor to generate the cargo signature. At a gate, station, access point, communication hub, or other location within the yard, the cargo signature related to the trailer may be received, and the cargo signature may also be transmitted via various communication connections, such as cellular and/or high bandwidth connections, to remote computing resources for monitoring, storage, or further processing. Further, a control system may command or instruct generating a cargo signature associated with an unloaded trailer.

The process 600 may then end, as at 630.

Using the freight sensor package described herein, various errors or events related to transit or transport processes may be detected by various onboard sensors, and stored or processed by onboard memories and processors. Upon arrival of a loaded trailer at a destination location for unloading, various additional processing steps may be performed based on any detected errors or events, in order to ensure efficient, reliable, and safe unloading processes. In addition, various errors or events related to unloading processes may be detected by various onboard sensors, and alerts or information may be provided to correct such errors or events. Further, upon completion of unloading processes, the freight sensor package may generate a cargo signature of any remaining objects within the trailer and/or an empty trailer, and the cargo signature may be utilized during subsequent monitoring or processing of the trailer, e.g., various subsequent loading, transporting, and/or unloading processes.

Figure 7:
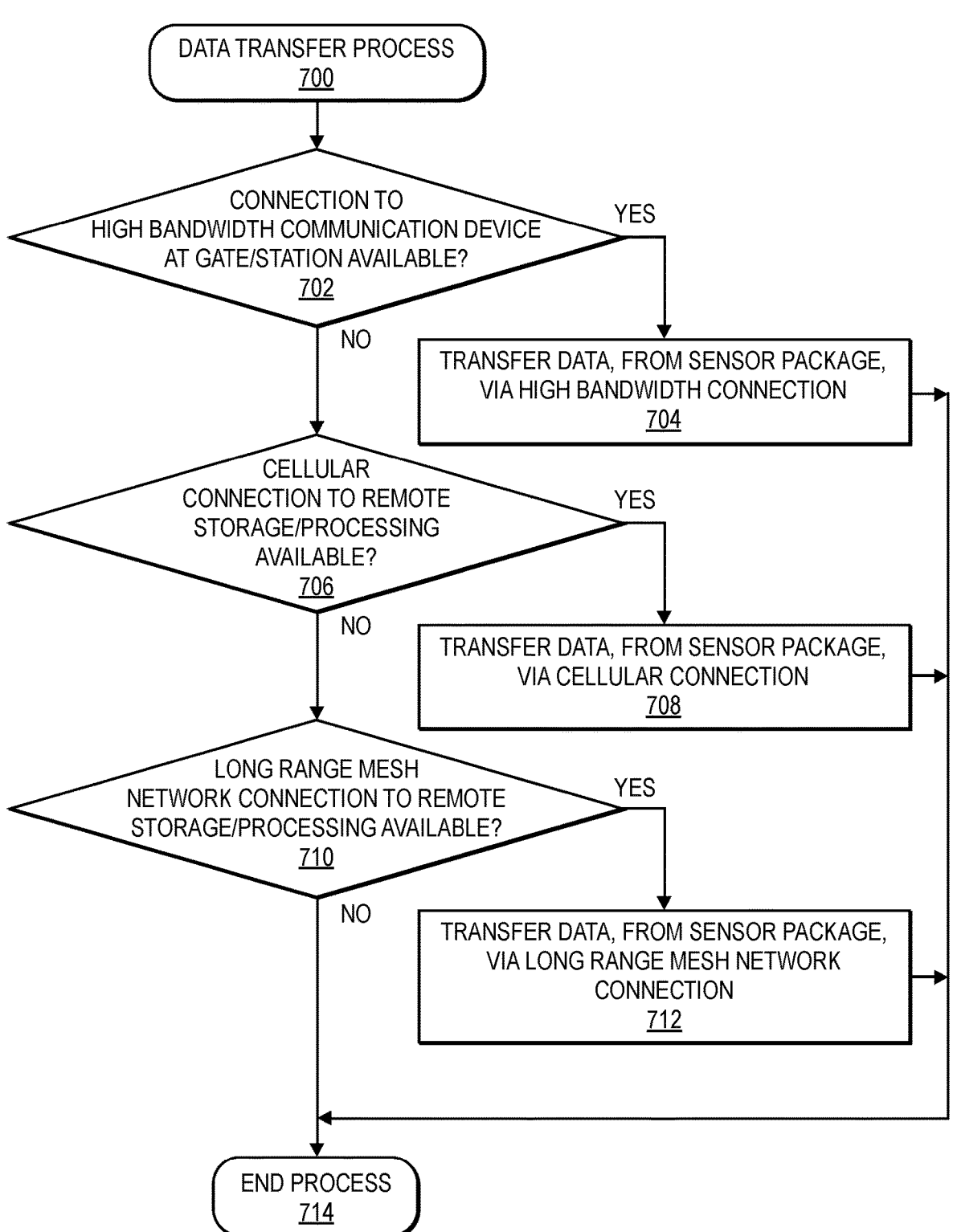
FIG. 7 is a flow diagram illustrating an example data transfer process, in accordance with implementations of the present disclosure.

FIG. 7 is a flow diagram illustrating an example data transfer process 700, in accordance with implementations of the present disclosure.

The process 700 may begin by determining whether a connection to a high bandwidth communication device at a gate/station is available, as at 702. For example, a gate, station, access point, communication hub, or other location may comprise a high bandwidth communication connection. A sensor package associated with a trailer may determine whether it is in communication range with a high bandwidth communication device. Further, a control system may command or instruct determining whether a connection to a high bandwidth communication device is available for a sensor package.

If a high bandwidth communication connection is available, the process 700 may continue by transferring data, from the sensor package, via the high bandwidth connection, as at 704. For example, various data captured by sensors onboard the sensor package, as well as various processing or determinations based on the data by processors onboard the sensor package, may be transferred to remote computing resources via the high bandwidth connection. The remote computing resources may comprise control systems, material handling facilities, cloud data storage and/or processing, and/or various other data storage and/or processing resources. In some examples, even if a high bandwidth communication connection may be available, the sensor package may not transmit data via the high bandwidth communication connection in order to save or conserve power, compute, and/or memory usage of the sensor package. Further, a control system may command or instruct transferring data via the high bandwidth connection.

If, however, a high bandwidth communication connection is not available, the process 700 may proceed by determining whether a cellular connection to remote storage/processing is available, as at 706. For example, a cellular tower, node, or satellite may comprise a cellular communication connection. A sensor package associated with a trailer may determine whether it is in communication range with a cellular connection. Further, a control system may command or instruct determining whether a cellular connection is available for a sensor package.

If a cellular connection is available, the process 700 may continue to transfer data, from the sensor package, via the cellular connection, as at 708. For example, various data captured by sensors onboard the sensor package, as well as various processing or determinations based on the data by processors onboard the sensor package, may be transferred to remote computing resources via the cellular connection. The remote computing resources may comprise control systems, material handling facilities, cloud data storage and/or processing, and/or various other data storage and/or processing resources. In some examples, even if a cellular connection may be available, the sensor package may not transmit data via the cellular connection in order to save or conserve power, compute, and/or memory usage of the sensor package. Further, a control system may command or instruct transferring data via the cellular connection.

If, however, a cellular connection is not available, the process 700 may proceed to determine whether a long range mesh network connection to remote storage/processing is available, as at 710. For example, a plurality of long range mesh network devices may comprise or form a peer-to-peer, long range mesh network. A sensor package associated with a trailer may determine whether it is in communication range with at least one peer device of the long range mesh network. Further, a control system may command or instruct determining whether a long range mesh network connection is available for a sensor package.

If a long range mesh network connection is available, the process 700 may continue with transferring data, from the sensor package, via the long range mesh network connection, as at 712. For example, various data captured by sensors onboard the sensor package, as well as various processing or determinations based on the data by processors onboard the sensor package, may be transferred to remote computing resources via the long range mesh network connection. The remote computing resources may comprise control systems, material handling facilities, cloud data storage and/or processing, and/or various other data storage and/or processing resources. In some examples, even if a long range mesh network connection may be available, the sensor package may not transmit data via the long range mesh network connection in order to save or conserve power, compute, and/or memory usage of the sensor package. Further, a control system may command or instruct transferring data via the long range mesh network connection.

After transferring data via one or more available communication connections, and/or if no communication connections are currently available, the process 700 may then end, as at 714.

Using the freight sensor package described herein, data captured by various sensors onboard the sensor package may be transmitted to remote computing resources using various available communication connections. A sensor package may or may not transmit data via available communication connections, in order to save or conserve power, compute, and/or memory usage of the sensor package. In some examples, a sensor package may utilize high bandwidth and/or cellular connections to transmit data when connected to an external or remote power source, e.g., near or at gates, stations, docks, yards, facilities, or other similar locations and/or during loading or unloading processes. In additional examples, a sensor package may utilize long range mesh network connections to transmit data when not connected to an external or remote power source, e.g., during transit or transport processes.

Figure 8:
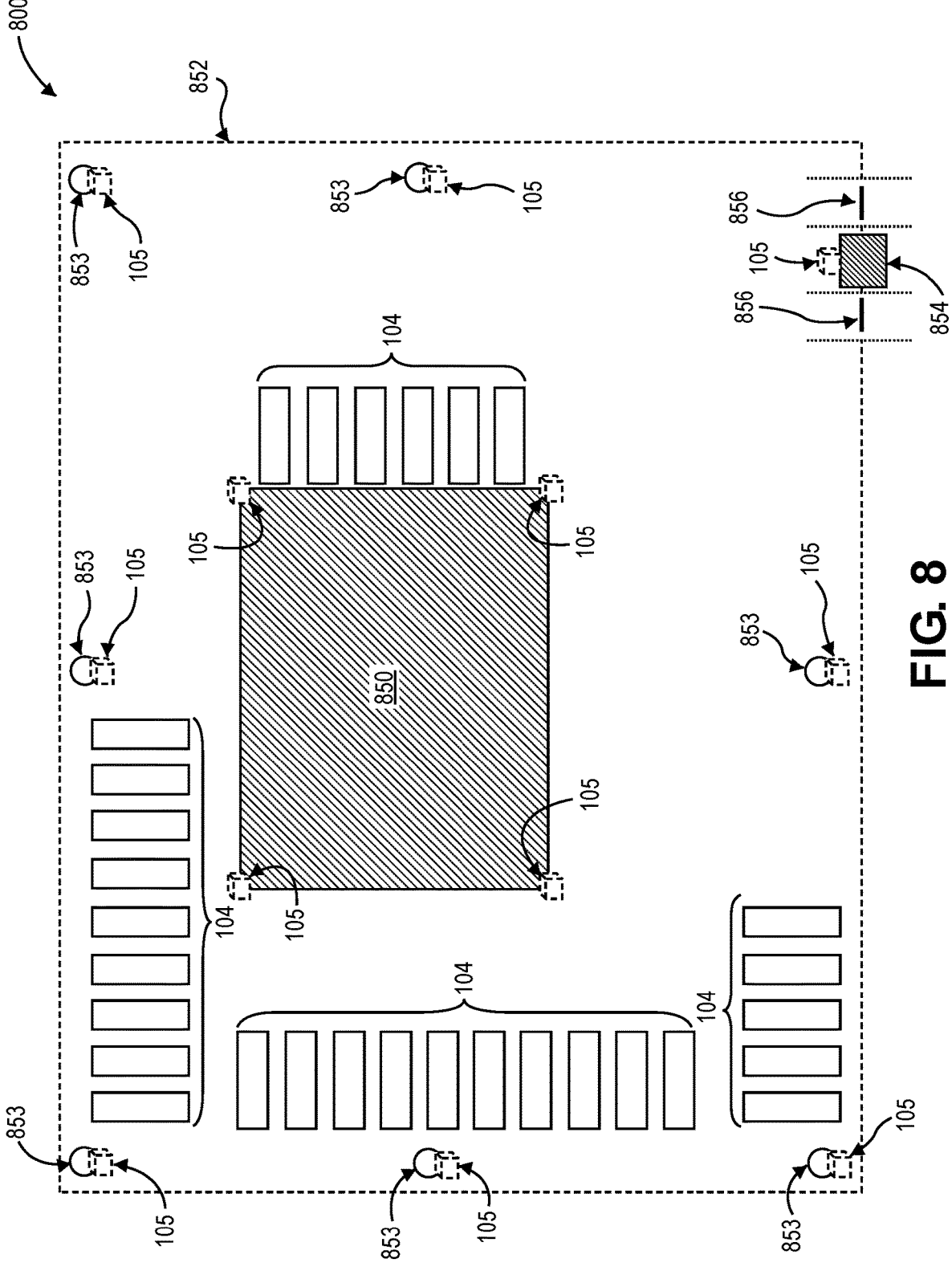
FIG. 8 is a schematic, top-down view diagram of an example yard having a plurality of freight sensor packages, in accordance with implementations of the present disclosure.

FIG. 8 is a schematic, top-down view diagram 800 of an example yard having a plurality of freight sensor packages, in accordance with implementations of the present disclosure.

As shown in FIG. 8, in some alternative example embodiments, the example freight sensor packages described herein may be used or implemented in other environments or applications than trailers, freight containers, shipping containers, or other similar transport containers. For example, the sensor packages may be utilized in substantially fixed or stationary positions or locations to capture data related to movement, positions, and/or changes to various objects within fields of view of the various sensors onboard the sensor packages.

In the example of FIG. 8, a material handling facility 850 may include a yard 852 surrounding the facility, and various columns, lights, poles, or other structures 853 having associated sensor packages 105. The sensor packages 105 may be coupled or attached to the structures 853 around the yard 852, and various sensors onboard the sensor packages 105 may have respective fields of view of portions of the facility 850 and/or yard 852. In addition, the facility 850 may include one or more stations 854 with associated gates 856 via which various tractors, trailers, vehicles, agents, or other objects may enter or leave the yard 852. One or more sensor packages 105 may also be coupled or attached to the stations 854 associated with the yard 852, and various sensors onboard the sensor packages 105 may have respective fields of view of portions of the stations 854, facility 850, and/or yard 852.

Using sensor packages 105 at substantially stationary positions relative to stations, facilities, yards, or other locations, various data related to objects entering, leaving, moving, or otherwise positioned proximate the facility 850 and/or within the yard 852 may be detected, stored, processed, and transmitted. In some examples, because the sensor packages 105 shown in FIG. 8 may be substantially stationary, the sensor packages 105 may not include some of the sensors described herein with respect to FIG. 2. For example, the stationary sensor packages 105 may not include GPS/GNSS receivers, inertial measurement units and/or accelerometers, and/or various other components.

Stationary sensor packages 105 associated with a material handling facility 850 and/or yard 852 may enable cost effective detection of vehicles, trailers, assets, or other objects around the facility 850 and within the yard 852, e.g., using mmWave radar sensors, Bluetooth sensors, and/or ultra-wideband communication devices. In addition, detection of vehicles, trailers, or other objects may improve safety for agents that may also move around or work within the facility 850 and the yard 852. Various events may be detected, such as potential impacts or accidents, unauthorized movements or changes, breaches of various operating procedures or standards associated with the yard, and/or other types of events.

In response to detecting one or more events by the stationary sensor packages 105, various alerts and/or information may be emitted or presented using visual and/or audio output devices of the sensor packages. In addition, in response to detecting one or more events by the stationary sensor packages 105, imaging sensors and/or microphones of the sensor packages may also be initiated or triggered to capture imaging and/or audio data related to detected events. Further, data, information, and/or instructions related to detected events may be transmitted or communicated to various portable communication devices, control systems, material handling facilities, or other systems or devices, in order to provide real-time information and ensure safe and efficient operations around the facility 850 and within the yard 852. Furthermore, because at least mmWave radar sensors may not be adversely affected by visual occlusions in the same manner as cameras or imaging devices, the sensor packages 105 described herein may provide more reliable detection of movements, positions, changes, or potential events around facilities or within yards as compared to conventional image-based security or monitoring systems.

In further example embodiments, the sensor packages described herein may also be used or implemented in indoor locations, such as inside material handling facilities, warehouses, retail environments, or various other types of indoor locations. The indoor sensor packages may again be substantially stationary as described above, and may capture data related to movement, position, changes, or other potential events using at least the mmWave radar sensors, Bluetooth sensors, and/or ultra-wideband communication devices onboard the sensor packages.

Figure 9:
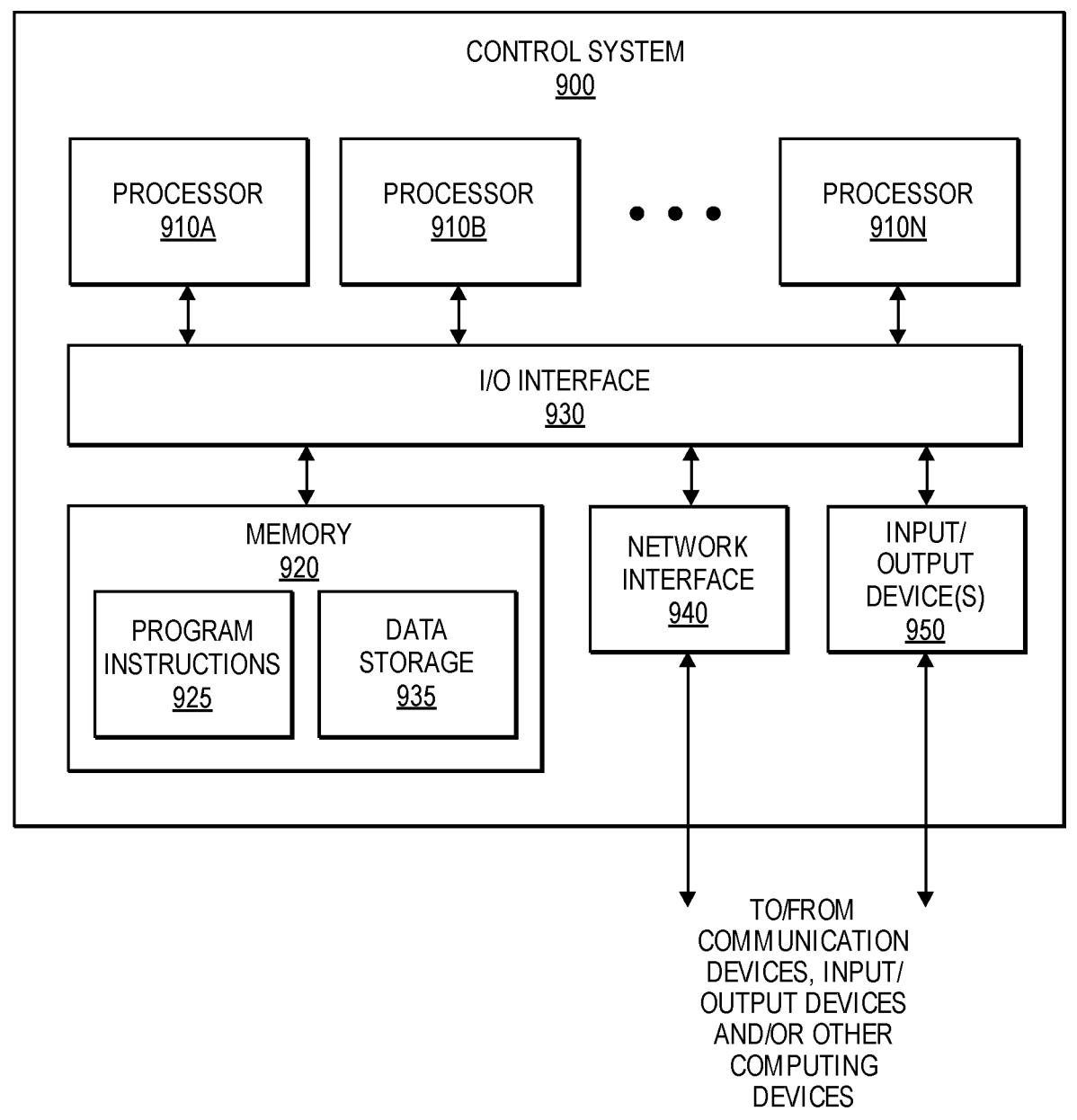
FIG. 9 is a block diagram illustrating various components of an example control system, in accordance with implementations of the present disclosure.

FIG. 9 is a block diagram illustrating various components of an example control system 900, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. In the illustrated implementation, a control system 900 includes one or more processors 910A, 910B through 910N, coupled to a non-transitory computer-readable storage medium 920 via an input/output (I/O) interface 930. The control system 900 further includes a network interface 940 coupled to the I/O interface 930, and one or more input/output devices 950. In some implementations, it is contemplated that a described implementation may be implemented using a single instance of the control system 900 while, in other implementations, multiple such systems or multiple nodes making up the control system 900 may be configured to host different portions or instances of the described implementations. For example, in one implementation, some data sources or services (e.g., related to portions of freight sensor packages and monitoring systems, operations, or processes, etc.) may be implemented via one or more nodes of the control system 900 that are distinct from those nodes implementing other data sources or services (e.g., related to other portions of freight sensor packages and monitoring systems, operations, or processes, etc.).

In various implementations, the control system 900 may be a uniprocessor system including one processor 910A, or a multiprocessor system including several processors 910A-910N (e.g., two, four, eight, or another suitable number). The processors 910A-910N may be any suitable processor capable of executing instructions. For example, in various implementations, the processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 910A-910N may commonly, but not necessarily, implement the same ISA.

The non-transitory computer-readable storage medium 920 may be configured to store executable instructions and/or data accessible by the one or more processors 910A-910N. In various implementations, the non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the control system 900. Generally speaking, a non-transitory, computer-readable storage medium may include storage media or memory media such as magnetic or optical media, e.g., disk or CD/DVD-ROM, coupled to the control system 900 via the I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processors 910A-910N, the non-transitory computer-readable storage medium 920, and any peripheral devices, including the network interface 940 or other peripheral interfaces, such as input/output devices 950. In some implementations, the I/O interface 930 may perform any necessary protocol, timing or other data transformations to convert data signals from one component (e.g., non-transitory computer-readable storage medium 920) into a format suitable for use by another component (e.g., processors 910A-910N). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer-readable storage medium 920, may be incorporated directly into the processors 910A-910N.

The network interface 940 may be configured to allow data to be exchanged between the control system 900 and other devices attached to a network, such as freight sensor packages, other control systems, material handling system controllers, warehouse management systems, other computer systems, remote computing resources, cloud storage and/or processing systems or devices, various material handling systems or equipment, or between nodes of the control system 900. In various implementations, the network interface 940 may support communication via wired or wireless general data networks, such as any suitable type of Ethernet network.

Input/output devices 950 may, in some implementations, include one or more displays, projection devices, screens, monitors, other visual input/output devices, speakers, microphones, other audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 900. Multiple input/output devices 950 may be present in the control system 900 or may be distributed on various nodes of the control system 900. In some implementations, similar input/output devices may be separate from the control system 900 and may interact with one or more nodes of the control system 900 through a wired or wireless connection, such as over the network interface 940.

As shown in FIG. 9, the memory 920 may include program instructions 925 that may be configured to implement one or more of the described implementations and/or provide data storage 935, which may comprise various tables, data stores and/or other data structures accessible by the program instructions 925. The program instructions 925 may include various executable instructions, programs, or applications to facilitate freight sensor package and monitoring operations and processes described herein, such as freight sensor package controllers, drivers, or applications, power supply or connection controllers, drivers, or applications, various sensor/receiver controllers, drivers, or applications, communication device controllers, drivers, or applications, visual/audio input/output device controllers, drivers, or applications, sensor data processing applications, programs, or software, material handling equipment controllers, drivers, or applications, etc. The data storage 935 may include various data stores for maintaining data related to systems, operations, or processes described herein, such as trailers or containers, freight sensor packages, power supplies or connections, various sensors/receivers, communication devices, visual/audio input/output devices, items, packages, carts, containers, agents, objects, sensor data, cargo signatures, errors or events, material handling equipment or apparatus, etc.

Those skilled in the art will appreciate that the control system 900 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 4-7, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A freight sensor package, comprising:
a battery;
a mmWave radar sensor;
a long range communication device;
an imaging sensor and a microphone; and
a processor in communication the mmWave radar sensor, the long range communication device, and a memory, the processor configured to at least:
receive a cargo signature associated with a plurality of objects that are loaded within a trailer prior to transport, the cargo signature comprising a combination of sensor data from the mmWave radar sensor and at least one additional sensor;
receive, from the mmWave radar sensor, data related to at least one change associated with an object of the plurality of objects that are within the trailer during transport;
instruct a comparison between the data related to the at least one change during transport and the cargo signature;
determine at least one event based on the comparison;
responsive to determination of the at least one event, instruct actuation of at least one of the imaging sensor or the microphone to capture imaging or audio data associated with the at least one event;
store the at least one event within the memory; and
transmit, via the long range communication device, the at least one event to a remote computing resource.

2. The freight sensor package of claim 1, further comprising:
a visual output device and an audio output device;
wherein the processor is further configured to:
responsive to determination of the at least one event, instruct actuation of at least one of the visual output device or the audio output device to present an alert or information related to the at least one event.

3. The freight sensor package of claim 1, wherein the long range communication device is configured to communicate with at least one other freight sensor package via a peer-to-peer, long range mesh communication network, the at least one other freight sensor package being associated with a second trailer that is separate from the freight sensor package associated with the trailer.

4. A device, comprising:
a mmWave radar sensor;

at least one of an imaging sensor or an audio input device; and a processor in communication the mmWave radar sensor and a memory, the processor configured to at least:

receive a cargo signature associated with an interior of a container, the cargo signature comprising a combination of sensor data from the mmWave radar sensor and at least one additional sensor;

receive, from the mmWave radar sensor, data related to a change associated with an object or an environment within the interior of the container;

instruct a comparison between the data related to the change and the cargo signature;

determine an event based on the comparison;

responsive to determination of the event, instruct actuation of at least one of the imaging sensor or the audio input device to capture imaging or audio data associated with the event; and store the event within the memory.

5. The device of claim 4, wherein the device is configured to be coupled to the interior of the container, the container comprising at least one of a trailer, freight container, shipping container, or unit load device.

6. The device of claim 4, wherein the data related to the change comprises at least one of:

an opening or closing of a door of the container;

a placement of an object within the container during a loading process;

a movement of an object within the container during a transport process; or a removal of an object from within the container during an unloading process at the destination.

7. The device of claim 4, wherein the cargo signature is associated with a plurality of objects that are loaded within the interior of the container during a loading process and prior to a transport process.

8. The device of claim 4, wherein the event comprises at least one of:

shifting or falling of an object within the container during transport;

unauthorized opening of a door of the container during transport;

unauthorized entry of an agent into the container during transport; or unauthorized placement, movement, or removal of an object within the container during transport.

9. The device of claim 4, further comprising:

an accelerometer configured to detect acceleration of the container;

wherein the data related to the change is received responsive to detection of an acceleration by the accelerometer.

10. The device of claim 4, further comprising:

at least one of a visual output device or an audio output device;

wherein the processor is further configured to:

responsive to determination of the event, instruct actuation of at least one of the visual output device or the audio output device to present an alert or information related to the event.

11. The device of claim 4, further comprising:

an onboard power supply; and a connection to an external power source;

wherein the device is configured to operate using the onboard power supply in an absence of a connected external power source.

12. The device of claim 4, further comprising:

at least one of a high bandwidth communication device, a cellular communication device, or a long range communication device;

wherein the processor is further configured to:

transmit, via at least one of the high bandwidth communication device, the cellular communication device, or the long range communication device, the event to a remote computing resource;

wherein based on the event, the remote computing resource is configured to determine additional unloading procedures during an unloading process at a destination.

13. A method, comprising:

receiving, by a processor, a cargo signature associated with an interior of a container, the cargo signature comprising a combination of sensor data from an mmWave radar sensor and at least one additional sensor positioned within the container;

receiving, by the processor, data related to a change associated with an object or an environment within the interior of the container;

instructing a comparison between the data related to the change and the cargo signature;

determining, by the processor, an event based on the comparison;

responsive to determination of the event, instructing actuation of at least one of an imaging sensor or an audio input device to capture imaging or audio data associated with the event; and storing, by the processor, the event within a memory.

14. The method of claim 13, wherein the cargo signature is associated with a plurality of objects that are loaded within the interior of the container during a loading process and prior to a transport process.

15. The method of claim 13, wherein the data related to the change is received during at least one of a loading process, a transport process, or an unloading process of the container.

16. The method of claim 13, further comprising:

instructing, by the processor, additional procedures during an unloading process based on the event.

17. The freight sensor package of claim 1, wherein the at least one additional sensor comprises at least one of the imaging sensor, a Bluetooth sensor, or an ultra-wideband communication device.

18. The device of claim 4, wherein the at least one additional sensor comprises at least one of the imaging sensor, a Bluetooth sensor, or an ultra-wideband communication device.

19. The method of claim 13, wherein the at least one additional sensor comprises at least one of the imaging sensor, a Bluetooth sensor, or an ultra-wideband communication device.

20. The device of claim 4, further comprising:

a long range communication device;

wherein the long range communication device is configured to communicate with at least one other device via a peer-to-peer, long range mesh communication network, the at least one other device being associated with a second container that is separate from the device associated with the container.

* * * * *